(12) United States Patent
Kato

(10) Patent No.: US 11,245,842 B2
(45) Date of Patent: Feb. 8, 2022

(54) APPEARANCE INSPECTION SYSTEM, SETTING DEVICE, IMAGE PROCESSING DEVICE, INSPECTION METHOD, AND PROGRAM

(71) Applicant: OMRON Corporation, Kyoto (JP)

(72) Inventor: Yutaka Kato, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 16/251,076

(22) Filed: Jan. 18, 2019

(65) Prior Publication Data

US 2019/0281213 A1 Sep. 12, 2019

(30) Foreign Application Priority Data

Mar. 12, 2018 (JP) .............................. JP2018-044034

(51) Int. Cl.
*H04N 5/232* (2006.01)
*G05B 19/05* (2006.01)
(Continued)

(52) U.S. Cl.
CPC ........ *H04N 5/23225* (2013.01); *B25J 9/1664* (2013.01); *B25J 9/1679* (2013.01);
(Continued)

(58) Field of Classification Search
CPC ........... G01N 21/8851; G01N 21/8806; G01N 21/88; G01N 21/9515; G01N 21/956;
(Continued)

(56) References Cited

U.S. PATENT DOCUMENTS

2007/0211240 A1 9/2007 Matsumoto et al.
2015/0237308 A1 8/2015 Tanaka et al.
(Continued)

FOREIGN PATENT DOCUMENTS

CN 104487564 4/2015
CN 107330938 11/2017
(Continued)

OTHER PUBLICATIONS

"Search Report of Europe Counterpart Application", dated Jul. 29, 2019, pp. 1-7.
(Continued)

*Primary Examiner* — Farhan Mahmud
(74) *Attorney, Agent, or Firm* — JCIPRNET

(57) ABSTRACT

To provide an appearance inspection system capable of reduce labor for setting an imaging condition by a designer when a plurality of inspection target positions on a target is sequentially imaged. An appearance inspection system includes an imaging condition decision part and a route decision part. The imaging condition decision part decides a plurality of imaging condition candidates including a relative position between a workpiece and an imaging device for at least one inspection target position among a plurality of inspection target positions. The route decision part decides a change route of an imaging condition for sequentially imaging the plurality of inspection target positions by selecting one imaging condition among the plurality of imaging condition candidates so that a pre-decided requirement is satisfied.

12 Claims, 14 Drawing Sheets

(51) Int. Cl.
    *G06T 7/00*     (2017.01)
    *H04N 5/225*     (2006.01)
    *B25J 9/16*     (2006.01)

(52) U.S. Cl.
    CPC ............ *G05B 19/05* (2013.01); *G06T 7/0004* (2013.01); *H04N 5/2256* (2013.01); *G05B 2219/31449* (2013.01); *G05B 2219/37063* (2013.01); *G05B 2219/37206* (2013.01); *G05B 2219/37584* (2013.01); *G05B 2219/40463* (2013.01); *G05B 2219/40565* (2013.01); *G05B 2219/40613* (2013.01); *G06T 2207/30164* (2013.01)

(58) Field of Classification Search
    CPC ......... G06T 7/001; G06T 7/73; G06T 7/0004; G06T 7/74; H04N 5/232; B25J 9/1697; G01B 11/24
    See application file for complete search history.

(56) References Cited

U.S. PATENT DOCUMENTS

2016/0238373 A1    8/2016    Featherstone
2017/0148154 A1*    5/2017    Nakao ................... G06T 7/0004
2019/0087977 A1*    3/2019    Kim ......................... G06T 7/80

FOREIGN PATENT DOCUMENTS

| | | |
|---|---|---|
| JP | H0891543 | 4/1996 |
| JP | 2001165863 | 6/2001 |
| JP | 2007240434 | 9/2007 |
| JP | 2007248241 | 9/2007 |
| JP | 2011209054 | 10/2011 |
| JP | 2013166185 | 8/2013 |
| JP | 2015163842 | 9/2015 |
| JP | 2016533484 | 10/2016 |
| WO | 2017065308 | 4/2017 |

OTHER PUBLICATIONS

"Office Action of Japan Counterpart Application" with English translation thereof, dated Feb. 9, 2021, p. 1-p. 10.

Office Action of China Counterpart Application, with English translation thereof, dated Jun. 3, 2021, pp. 1-33.

"Office Action of Japan Counterpart Application" with English translation thereof, dated Oct. 5, 2021, p. 1-p. 9.

* cited by examiner

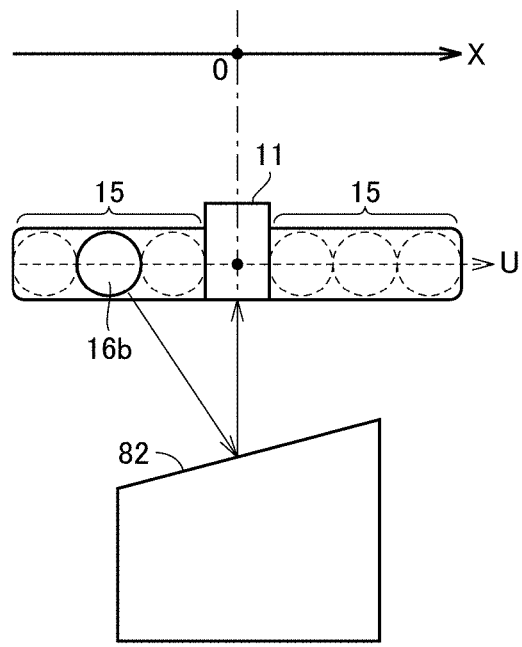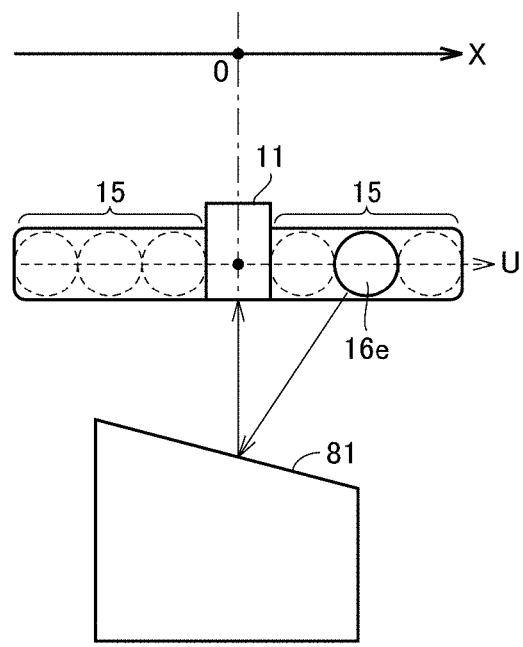
FIG. 19(a)   FIG. 19(b)
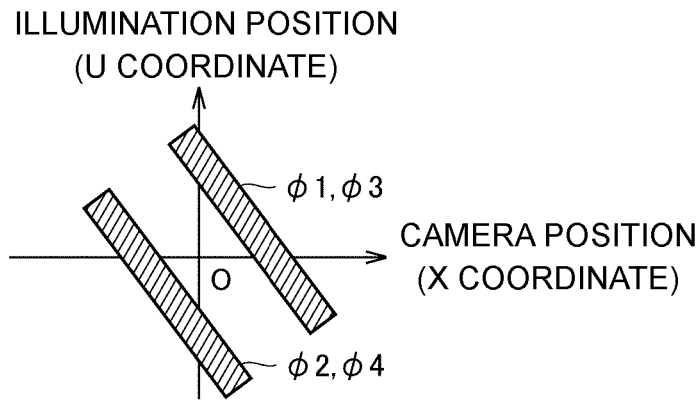
FIG. 20

APPEARANCE INSPECTION SYSTEM, SETTING DEVICE, IMAGE PROCESSING DEVICE, INSPECTION METHOD, AND PROGRAM

CROSS-REFERENCE TO RELATED APPLICATION

This application claims the priority benefit of Japanese Patent Application serial no. 2018-044034, filed on Mar. 12, 2018. The entirety of the above-mentioned patent application is hereby incorporated by reference herein and made a part of this specification.

BACKGROUND

Technical Field

The disclosure relates to an appearance inspection system inspecting a target using a captured image, a setting device setting an imaging condition of the appearance inspection system, an image processing device used in the appearance inspection system, and a setting method and a program for setting an imaging condition of the appearance inspection system.

Description of Related Art

Many appearance inspection systems inspecting targets such as resins, metals, and the like using image processing technologies have been proposed.

For example, Japanese Laid-Open No. 2007-248241 (Patent Document 1) discloses an inspection device including an imaging device that images a target, an illumination device that illuminates a field of view of the imaging device, a support device that supports a position and an attitude of the target or the imaging device to be changeable, a control device that controls operations of the imaging device and the support device, and an image processing device that performs image processing to take an image generated by the imaging device under illumination of the illumination device for inspection. The control device generates setting information indicating a relation between the imaging device and the target which is satisfied at the time of imaging in imaging performed on the target a plurality of times. Japanese Laid-Open No. 2007-240434 (Patent Document 2) discloses a similar technology.

RELATED ART DOCUMENT(S)

Patent Document(S)

[Patent Document 1] Japanese Laid-Open No. 2007-248241
[Patent Document 2] Japanese Laid-Open No. 2007-240434

In the above-described inspection devices of the related arts, optimum imaging conditions are set for each inspection target position on a target. However, change routes of imaging conditions when a plurality of inspection target positions are sequentially imaged are not considered. Therefore, it is necessary for designers to preset the change routes of the imaging conditions including relative positions between the target and the imaging device. However, when the designers manually set the change routes of optimum imaging conditions, it takes some time and labor.

SUMMARY

According to an example of the disclosure, an appearance inspection system that performs appearance inspection by imaging a target using an imaging device while causing a relative position between the target and the imaging device to be different includes a first decision part that decides one imaging condition candidate or a plurality of imaging condition candidates including the relative position between the target and the imaging device in the inspection for each of a plurality of inspection target positions on the target. The first decision part decides a plurality of imaging condition candidates for at least one inspection target position among the plurality of inspection target positions. The appearance inspection system further includes a second decision part that decides a change route of the imaging condition for sequentially imaging the plurality of inspection target positions by selecting the one imaging condition candidate or one of the plurality of imaging condition candidates decided for each of the plurality of inspection target positions as an imaging condition so that a pre-decided requirement is satisfied.

According to an example of the disclosure, a setting device is used in the appearance inspection system and sets the change route. The setting device includes the first decision part and the second decision part.

According to an example of the disclosure, an image processing device that is used in the appearance inspection system and determines quality of an appearance of the target includes a determination part that determines quality of the appearance of the target by processing an image captured on an imaging condition decided for each of the plurality of inspection target positions; and an output part that outputs at least one of a first determination result indicating quality of each of the plurality of inspection target positions, a second determination result indicating quality of an inspection target region including at least one of the plurality of inspection target positions, and a third determination result indicating quality of the target based on the determination of the determination part.

According to an example of the disclosure, a setting method in an appearance inspection system that performs appearance inspection by imaging a target using an imaging device while causing a relative position between the target and the imaging device to be different includes deciding one imaging condition candidate or a plurality of imaging condition candidates including the relative position between the target and the imaging device in the inspection for each of a plurality of inspection target positions on the target. In the deciding of the one imaging condition candidate or the plurality of imaging condition candidates, a plurality of imaging condition candidates are decided for at least one inspection target position among the plurality of inspection target positions. The setting method further includes deciding a change route of the imaging condition for sequentially imaging the plurality of inspection target positions by selecting the one imaging condition candidate or one of the plurality of imaging condition candidates decided for each of the plurality of inspection target positions as an imaging condition so that a pre-decided requirement is satisfied.

According to an example of the disclosure, a program supporting an appearance inspection system that performs appearance inspection by imaging a target using an imaging device while causing a relative position between the target and the imaging device to be different causes a computer to perform: deciding one imaging condition candidate or a plurality of imaging condition candidates including the relative position between the target and the imaging device in the inspection for each of a plurality of inspection target positions on the target. In the deciding of the one imaging condition candidate or the plurality of imaging condition candidates, a plurality of imaging condition candidates are decided for at least one inspection target position among the plurality of inspection target positions. The setting program causes the computer to further perform deciding a change route of the imaging condition for sequentially imaging the plurality of inspection target positions by selecting the one imaging condition candidate or one of the plurality of imaging condition candidates decided for each of the plurality of inspection target positions as an imaging condition so that a pre-decided requirement is satisfied.

BRIEF DESCRIPTION OF THE DRAWINGS

FIG. 19(a) and FIG. 19(b) are diagrams illustrating an example of the position of the imaging device in the example illustrated in FIG. 5 when the inspection target positions illustrated in FIG. 15 are imaged.

FIG. 20 is a diagram illustrating a distribution of U coordinates of a lighting illumination element and X coordinates of the camera included in the imaging condition candidate groups decided for each of the inspection target positions.

DESCRIPTION OF THE EMBODIMENTS

Figure 1:
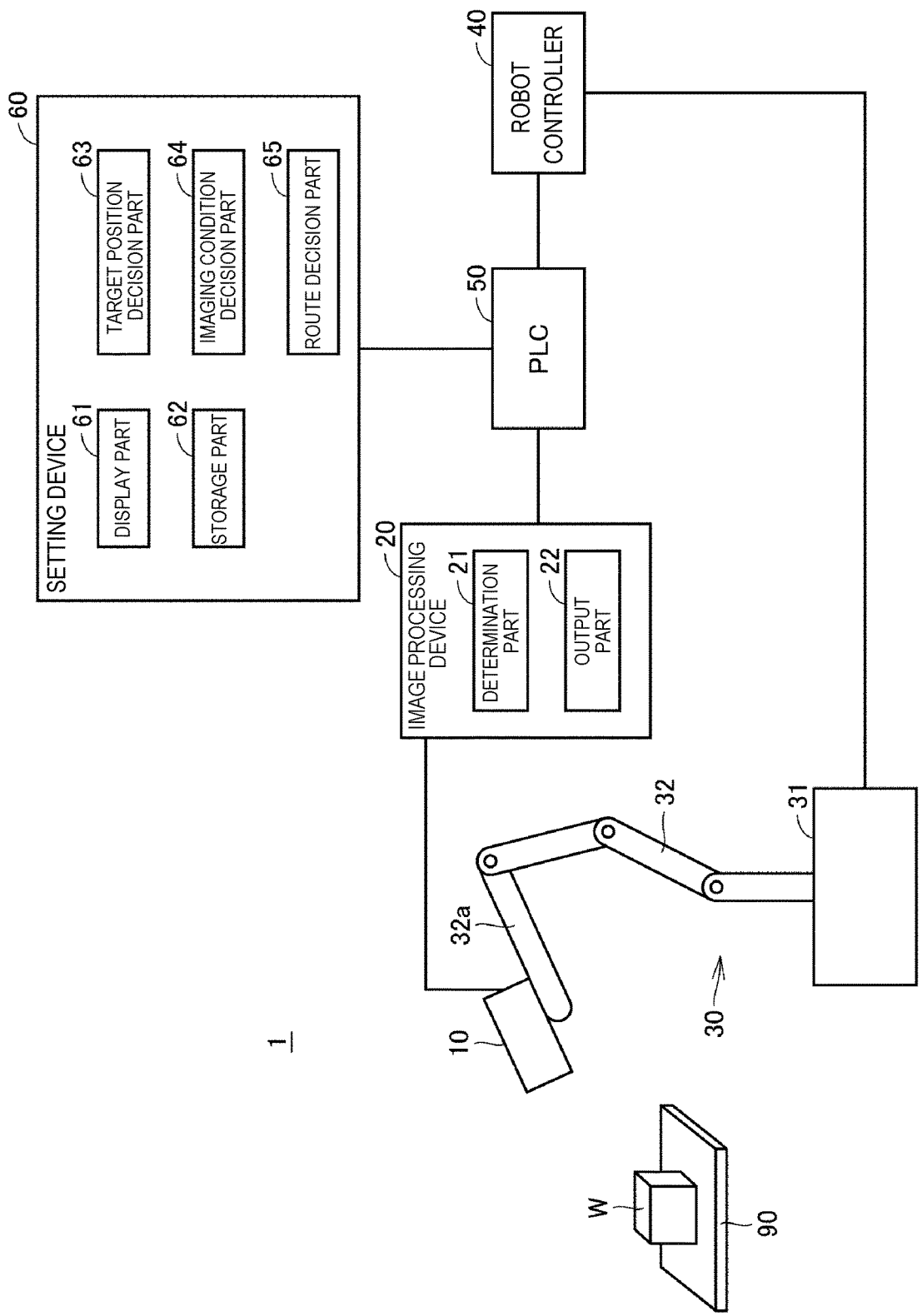
FIG. 1 is a schematic view illustrating an overview of an appearance inspection system according to an embodiment.

The embodiments of the disclosure provide an appearance inspection system capable of reducing labor of a designer setting an imaging condition when a plurality of inspection target positions on a target are sequentially imaged, a setting device setting the imaging condition of the appearance inspection system, and an image processing device, a setting method, and a program used in the appearance inspection system.

According to the example of the disclosure, when it is necessary to inspect the appearance of a new product or a new type of target, the change route of the imaging condition satisfying the pre-decided requirement is automatically decided by the appearance inspection system. As a result, it is possible to reduce labor of setting the condition by a designer when the plurality of inspection target positions on the target are sequentially imaged.

According to the example of the disclosure, the imaging device may include an illumination part that radiates light to the target, a lens part that forms an image from light reflected from the target on an image sensor, and a camera control part that controls the image sensor to output image data. The imaging condition may include at least one of an illumination condition of the illumination part, an optical condition of the lens part, and a control condition of the camera control part.

According to the example of the disclosure, it is possible to automatically decide the change route of at least one of the illumination condition of the illumination part, the optical condition of the lens part, and the control condition of the camera control part.

According to the above-described example of the disclosure, the second decision part may calculate an evaluation value of each of a plurality of combination patterns in which at least one of an imaging order of the plurality of inspection target positions and the imaging condition decided for the plurality of inspection target positions is mutually different and decide the change route based on the evaluation value. According to the example of the disclosure, the change route of the imaging condition is automatically set through the calculation of the evaluation value.

According to the above-described example of the disclosure, the evaluation value may be calculated using an evaluation function including a term that depends on a time necessary to complete imaging of all the plurality of inspection target positions while sequentially changing the imaging condition. According to the example of the disclosure, it is possible to automatically set the change route of the imaging condition of the short entire imaging time.

According to the above-described example of the disclosure, the appearance inspection system may further include a third decision part that sets one or more inspection target regions on the target and decides one or more inspection target positions corresponding to the inspection target region so that an inspection requirement corresponding to the inspection target region is satisfied. According to the example of the disclosure, it is possible to automatically decide the inspection target position among the inspection target region which is desired to be inspected.

According to the above-described example of the disclosure, it is possible to reduce labor of setting the condition by a designer when the plurality of inspection target positions on the target are sequentially imaged.

According to the example of the disclosure, the quality of the appearance of the object is determined using the images captured along the change route of the automatically set imaging condition, and the determination is output. Thus, the user can easily recognize the quality of the appearance of the target.

According to the example of the disclosure, it is possible to reduce labor of setting the condition by a designer when the plurality of inspection target positions on the target are sequentially imaged.

According to the embodiments of the disclosure, it is possible to reduce labor of setting the condition by a designer when the plurality of inspection target positions on the target are sequentially imaged.

Embodiments of the disclosure will be described in detail with reference to the drawings. The same reference signs are given to the same or equivalent portions in the drawings and the description thereof will not be repeated.

1. Application Example

First, an example of a situation in which the disclosure is applied will be described with reference to FIG. 1. FIG. 1 is a schematic view illustrating an overview of an appearance inspection system 1 according to an embodiment.

The appearance inspection system 1 according to the embodiment images a plurality of inspection target positions on a target (hereinafter also referred to as a "workpiece W") placed on a stage 90 and inspects the appearance of the workpiece W using the obtained images in, for example, a production line or the like industrial products. In the appearance inspection, flaws, stains, presence or absence of foreign substances, dimensions, and the like of the workpiece W are inspected.

When the appearance inspection of the workpiece W place onto the stage 90 is completed, a subsequent workpiece W is transported on the stage 90. At this time, the workpiece W is placed at a pre-decided attitude at a pre-decided position on the stage 90.

As illustrated in FIG. 1, the appearance inspection system 1 includes an imaging device 10, an image processing device 20, a robot 30, a robot controller 40, a programmable logic controller (PLC) 50, and a setting device 60.

The imaging device 10 images a subject which is within an imaging field of view in response to an instruction from the image processing device 20 to generate image data and images the workpiece W which is an appearance inspection target as a subject.

The image processing device 20 outputs an imaging instruction to the imaging device 10 in response to an instruction from the PLC 50. The image processing device 20 includes a determination part 21 and an output part 22. The determination part 21 determines quality of the appearance of the workpiece W by performing a pre-decided process on the image data generated by the imaging device 10. The output part 22 outputs a determination result by the determination part 21. For example, the output part 22 causes a display part 61 included in the setting device 60 or a display device (not illustrated) to display the determination result.

The robot 30 is, for example, a vertically articulated robot in which a plurality of arms 32 on a base 31 are connected. Each connection unit of the plurality of arms 32 includes a rotational shaft. The imaging device 10 is fitted at a distal end of a distal end arm 32a. The robot controller 40 controls the robot 30 in response to an instruction from the PLC 50 and changes a relative position between the workpiece W and the imaging device 10 and the attitude of the imaging device 10 with respect to the workpiece W.

As described above, the workpiece W is placed at a pre-decided attitude at a pre-decided position on the stage 90. Therefore, the robot 30 can change the relative position between the imaging device 10 and the workpiece W and the attitude of the imaging device 10 with respect to the workpiece W by changing the relative position and the attitude of the imaging device 10 with respect to the stage 90. That is, the robot 30 can change the relative position between the imaging device 10 and the workpiece W and the attitude of the imaging device 10 with respect to the workpiece W by moving the imaging device 10 using a coordinate system in which a point on the stage 90 is the origin.

The PLC 50 controls the robot controller 40 and the image processing device 20 such that the imaging device 10 sequentially images the plurality of inspection target positions on the workpiece W. The PLC 50 controls the robot controller 40 along a change route of an imaging condition set by the setting device 60. Further, the PLC 50 controls the image processing device 20 such that an imaging instruction is output at a timing satisfying an imaging condition designated by the imaging device 10.

The setting device 60 sets the change route of the imaging condition including the relative position between the workpiece W and the imaging device 10 to sequentially image the plurality of inspection target positions on the workpiece W. When it is necessary to inspect the appearance of a new product or a new type of workpiece W, the setting device 60 sets the change route of the imaging condition appropriate for the workpiece W.

As illustrated in FIG. 1, the setting device 60 includes a display part 61, a storage part 62, a target position decision part 63, an imaging condition decision part 64, and a route decision part 65. The display part 61 is, for example, a touch panel. The storage part 62 is, for example, an auxiliary storage device such as a hard disk drive or a solid-state drive and stores processing programs to be executed by the target position decision part 63, the imaging condition decision part 64, and the route decision part 65, data indicating information regarding setting of a designation route, and the like.

The target position decision part 63 reads 3-dimensional design data (for example, computer-aided design (CAD) data) indicating the designed surface of the workpiece W stored in the storage part 62 and causes the display part 61 to display a schematic diagram of the designed appearance of the workpiece W. The target position decision part 63 decides an inspection target region on the workpiece W in accordance with an input by a user. Further, the target position decision part 63 decides a plurality of inspection target positions within the inspection target region so that the entire inspection target region is imaged.

The imaging condition decision part 64 decides an imaging condition including a relative position between the workpiece W and the imaging device 10 for each of the plurality of inspection target positions. Here, the imaging condition decision part 64 decides a plurality of imaging condition candidates for at least one inspection target position among the plurality of inspection target positions. For example, when an inspection target position is permitted to be imaged in an imaging direction within a predetermined angle (for example, 20°) from a normal direction of the surface of the workpiece W at the inspection target position, the imaging condition decision part 64 decides a plurality of imaging condition candidates in which the relative position between the workpiece W and the imaging device 10 is mutually different for the inspection target position.

The route decision part 65 selects one imaging condition among the plurality of imaging condition candidates for each inspection target position as an imaging condition so that a pre-decided requirement is satisfied and decides an order of the plurality of imaging conditions corresponding to each of the plurality of inspection target positions. The route decision part 65 decides a change route of the imaging condition including the relative position between the workpiece W and the imaging device 10 to sequentially image the plurality of inspection target positions on the workpiece W in accordance with the selected imaging condition and the decided order.

Figure 2:
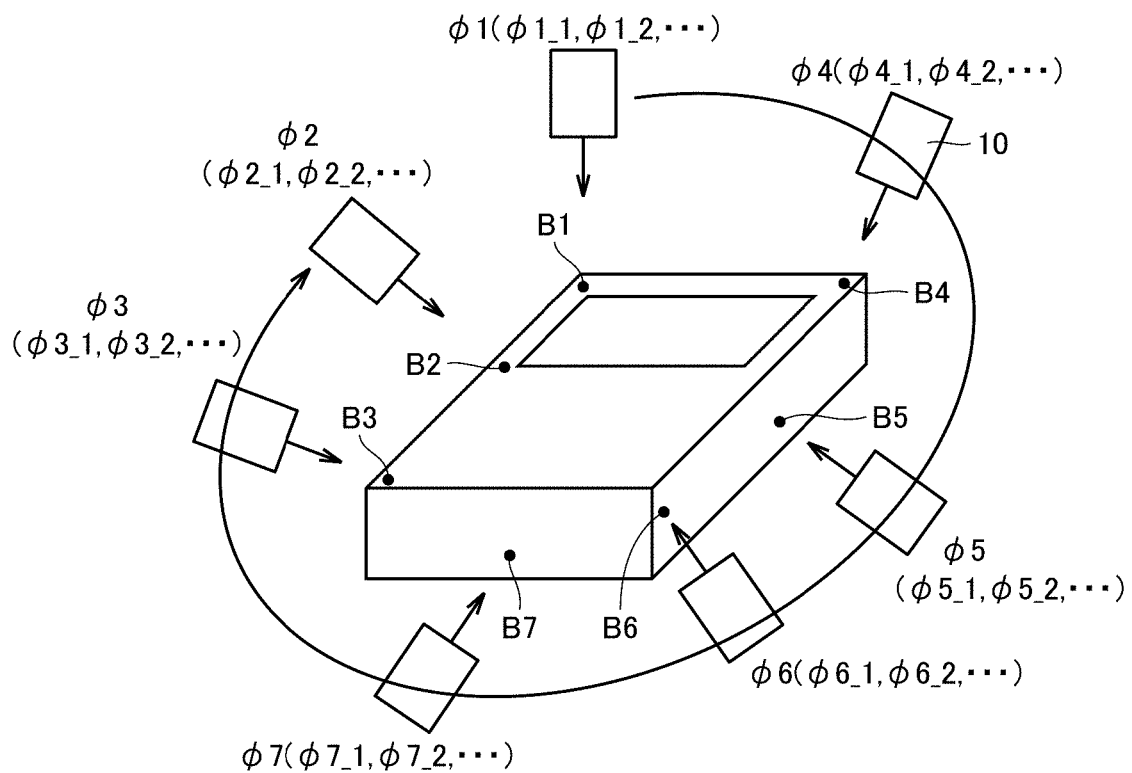
FIG. 2 is a diagram illustrating examples of a plurality of inspection target positions decided for a workpiece W and an imaging condition candidate group decided for each inspection target positions.

FIG. 2 is a diagram illustrating examples of a plurality of inspection target positions decided for the workpiece W and an imaging condition candidate group decided for each inspection target positions. In the example illustrated in FIG. 2, seven inspection target positions B1 to B7 are decided. Further, for the inspection target position B1, an imaging condition candidate group φ1 formed by imaging condition candidates φ1_1, φ_2, and the like is decided. Similarly, for the inspection target positions B2 to B7, imaging condition candidate groups φ2 to φ7 are decided.

Figure 3:
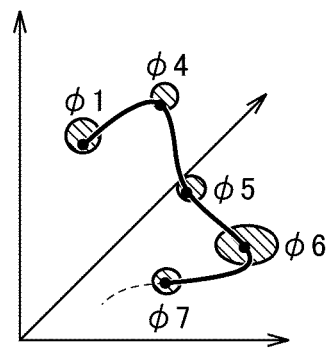
FIG. 3 is a diagram illustrating an example of a change route of an imaging condition decided by a route decision part illustrated in FIG. 1.

FIG. 3 is a diagram illustrating an example of a change route of an imaging condition decided by the route decision part 65. An imaging condition is expressed by n (where n is an integer equal to or greater than 1) parameters. Therefore, the imaging condition is indicated in an n-dimensional space illustrated in FIG. 3. For example, the imaging condition includes six parameters: X, Y, and Z coordinates of the imaging device 10 in the XYZ coordinate system that has a point on the stage 90 as the origin and θx, θy, and θz for specifying a direction of an optical axis of the imaging device 10. θx is an angle formed between the X axis and a line obtained by projecting the optical axis of the imaging device 10 to the XY plane, θy is an angle formed between the Y axis and a line obtained by projecting the optical axis of the imaging device 10 to the YZ plane, and θz is an angle formed between the Z axis and a line obtained by projecting the optical axis of the imaging device 10 to the ZX plane. The XYZ coordinates are the parameters for specifying a relative position between the workpiece W and the imaging device 10 and θx, θy, and θz are the parameters for specifying an attitude of the imaging device 10 with respect to the workpiece W.

As illustrated in FIG. 3, the imaging condition candidate groups φ1 to φ7 (φ2 and φ3 are not illustrated) are indicated in expanded ranges rather than points in the n-dimensional space. The route decision part 65 selects one point from each of the ranges of the imaging condition candidate groups φ1 to φ7 and decides a change route of the imaging condition by binding the selected seven points in order so that a pre-decided requirement is satisfied.

The pre-decided requirement is, for example, a requirement that a time necessary to complete imaging of all the inspection target positions while sequentially changing imaging conditions be set to be as short as possible. In this case, a route indicated by a line in which a time necessary to change the imaging conditions is the shortest among a plurality of lines binding the imaging condition candidate groups φ1 to φ7 illustrated in FIG. 3 in order is decided as the change route of the imaging condition. For example, a relative position between the workpiece W and the imaging device 10 indicated by the imaging condition candidate group φ1 is closer to a relative position between the workpiece W and the imaging device 10 indicated by the imaging condition candidate group φ4 than a relative position between the workpiece W and the imaging device 10 indicated by the imaging condition candidate group φ7. Therefore, the route decision part 65 decides a route indicated by a line binding one point selected from the imaging condition candidate group φ1 and one point selected from the imaging condition candidate group φ4 as the change route.

In this way, the appearance inspection system 1 includes the imaging condition decision part 64 and the route decision part 65. The imaging condition decision part 64 decides the plurality of imaging condition candidates including the relative position between the workpiece W and the imaging device 10 for at least one inspection target position among the plurality of inspection target positions. The route decision part 65 decides the change route of the imaging condition to sequentially image the plurality of inspection target positions by selecting one imaging condition among the plurality of imaging condition candidates so that the pre-decided requirement is satisfied.

Thus, when it is necessary to inspect the appearance of a new product or a new type of target, the change route of the imaging condition satisfying the pre-decided requirement is automatically decided by the appearance inspection system 1. As a result, it is possible to reduce labor of setting the condition by a designer when the plurality of inspection target positions on the workpiece W are sequentially imaged.

2. Specific Example

Next, an example of each configuration of the appearance inspection system according to the embodiment will be described.

(A. Imaging Device)

Figure 4:
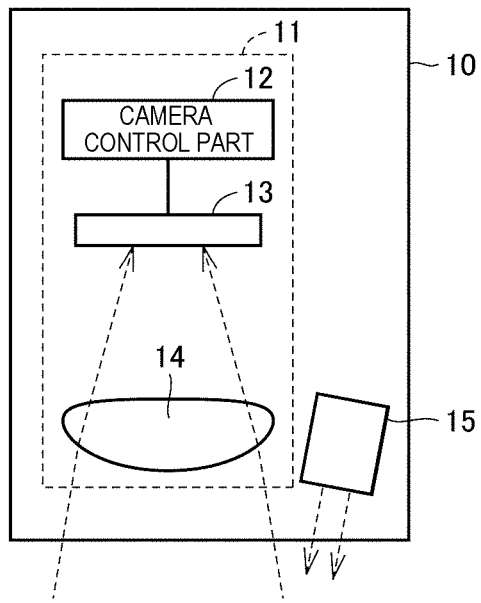
FIG. 4 is a diagram illustrating an example of an imaging device illustrated in FIG. 1.

FIG. 4 is a diagram illustrating an example of the imaging device 10. The imaging device 10 in the example illustrated in FIG. 4 includes a camera 11 and an illumination part 15. The camera 11 and the illumination part 15 are integrated. The illumination part 15 radiates light to the workpiece W.

The light radiated from the illumination part 15 is reflected from the surface of the workpiece W and is incident on the camera 11.

The camera 11 includes a camera control part 12, an image sensor 13, and a lens part 14. The lens part 14 forms an image from the light reflected from the workpiece W on the image sensor 13. The lens part 14 may include only one lens or may include a plurality of lenses. The image sensor 13 is, for example, a photoelectric conversion element such as a complementary metal oxide semiconductor (CMOS) image sensor and converts light from the imaging field of view of the camera 11 into an image signal. The camera control part 12 controls the image sensor 13 and outputs image data.

When an illumination condition in the illumination part 15 is variable, the imaging condition decision part 64 may decide an imaging condition including the illumination condition. Examples of the illumination condition include an illumination intensity, a luminescent color, and the like. When an optical condition of the lens part 14 is variable, the imaging condition decision part 64 may decide an imaging condition including the optical condition. Examples of the optical condition include a focus position, a zoom magnification (focal distance), and the like. When a control condition in the camera control part 12 is variable, the imaging condition decision part 64 may decide an imaging condition including the control condition. Examples of the control condition include a shutter speed and the like. The imaging condition decision part 64 may decide an imaging condition including at least one of the illumination condition of the illumination part 15, the optical condition of the lens part 14, and the control condition of the camera control part 12.

The shape of the illumination part 15 is not particularly limited and may be one of a dome shape, a ring shape (a circular shape or a square shape), and a bar shape.

Figure 5:
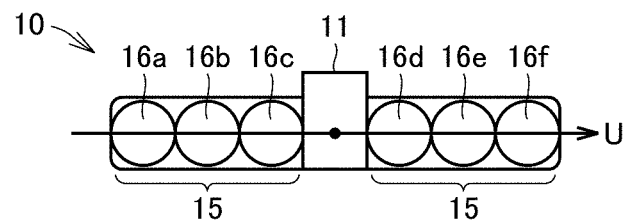
FIG. 5 is a diagram illustrating another example of the imaging device illustrated in FIG. 1.

FIG. 5 is a diagram illustrating another example of the imaging device 10. The imaging device 10 in the example illustrated in FIG. 5 is different from the imaging device 10 in the example illustrated in FIG. 4 in that the illumination part 15 includes a plurality of illumination elements 16a to 16f. The plurality of illumination elements 16a to 16f are separately controlled to be turned on. Therefore, it is possible to turn on only some of the plurality of illumination elements 16a to 16f and to turn off the remaining illumination elements. For the imaging device 10 in the example illustrated in FIG. 5, the imaging condition decision part 64 may decide an imaging condition including an illumination pattern (one of the illumination conditions) indicating the illumination elements that are turned on among the plurality of illumination elements 16a to 16f. The illumination elements that are turned on are expressed by U coordinates (see FIG. 5) that have a point on the camera 11 as the origin.

In the examples illustrated in FIGS. 4 and 5, the camera 11 and the illumination part 15 are integrated. However, a relative position between the camera 11 and the illumination part 15 may be variable. In this case, the imaging condition decision part 64 may decide an imaging condition including the relative position between the camera 11 and the illumination part 15 and an attitude of the illumination part 15 with respect to the camera 11. The relative position between the camera 11 and the illumination part 15 is expressed in a UVW coordinate system that has a point on the camera 11 as the origin. The attitude of the illumination part 15 with respect to the camera 11 is expressed by parameters θu, θv, and θw for specifying a radiation direction of light of the illumination part 15. θu is an angle formed between the U axis and a line obtained by projecting the radiation direction of the light of the illumination part 15 to the UV plane, θv is an angle formed between the V axis and a line obtained by projecting the radiation direction of the light of the illumination part 15 to the VW plane, and θw is an angle formed between the W axis and a line obtained by projecting the radiation direction of the light of the illumination part 15 to the WU plane.

(B. Hardware Configuration of Setting Device)

Figure 6:
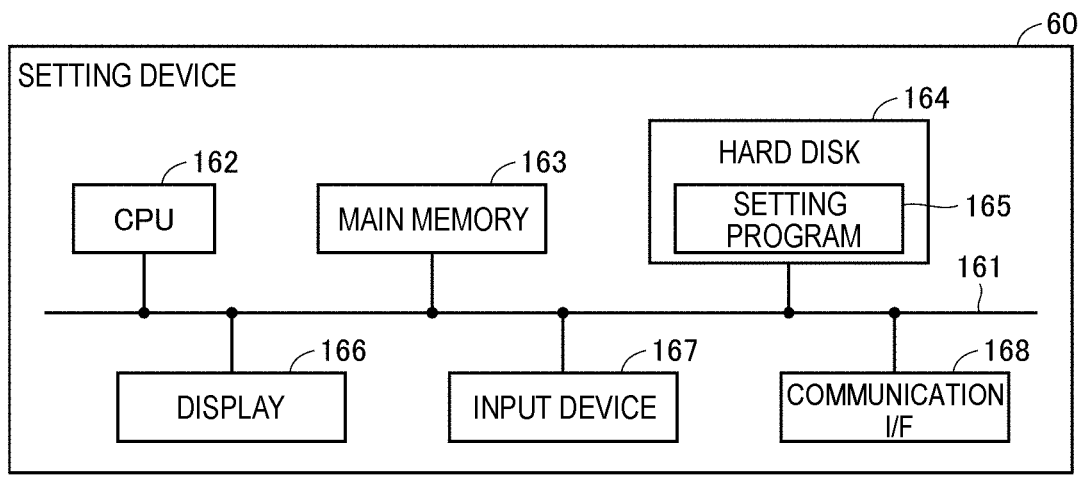
FIG. 6 is a schematic diagram illustrating a hardware configuration of a setting device illustrated in FIG. 1.

FIG. 6 is a schematic diagram illustrating a hardware configuration of the setting device 60. The setting device 60 includes a central processing unit (CPU) 162, a main memory 163, a hard disk 164, a display 166, an input device 167, and a communication interface (I/F) 168. These units are connected to be able to mutually perform data communication via a bus 161.

The CPU 162 performs various arithmetic calculations by loading programs (codes) including the setting program 165 installed in the hard disk 164 on the main memory 163 and executing the programs in a predetermined order. The main memory 163 is generally a volatile storage device such as a dynamic random access memory (DRAM).

The hard disk 164 is an internal memory included in the setting device 60 and a nonvolatile storage device and stores various programs such as the setting program 165. A semiconductor storage device such as a flash memory may be adopted in addition to or instead of the hard disk 164.

The setting program 165 is a program indicating a procedure in which the change route of the imaging condition is set by the setting device 60. Various programs such as the setting program 165 may not be necessarily stored in the hard disk 164 and may be stored in a server that can communicate with the setting device 60 or an external memory which can be directly connected to the setting device 60. For example, various programs to be executed in the external memory in the setting device 60 and various parameters to be used in the various programs are distributed in a stored state, and the setting device 60 reads the various programs and the various parameters from the external memory. The external memory is a medium that stores information such a program recorded on a computer, another device, a machine, or the like by an electric, magnetic, optical, mechanical, or chemical target operation so that the information is readable. Alternatively, programs or parameters downloaded to a server or the like which is connected to be communicable with the setting device 60 may be installed in the setting device 60.

The display 166 is, for example, a liquid crystal display. The input device 167 includes, for example, a mouse, a keyboard, a touch panel, or the like.

The communication I/F 168 exchanges various kinds of data between the PLC 50 and the CPU 162. The communication I/F 168 may exchange data between the server and the CPU 162. The communication I/F 168 includes hardware corresponding to a network for exchanging various kinds of data with the PLC 50.

The display part 61 illustrated in FIG. 1 includes the display 166. The storage part 62 illustrated in FIG. 1 includes the main memory 163 or the hard disk 164. The target position decision part 63, the imaging condition decision part 64, and the route decision part 65 illustrated in FIG. 1 are realized by the CPU 162, the main memory 163, and the hard disk 164.

The setting program 165 according to the embodiment may be embedded in a part of another program to be provided. Instead, some or all of the processes provided by executing the setting program 165 may be performed by a dedicated hardware circuit.

(C. Flow of Process in Setting Device)

Figure 7:
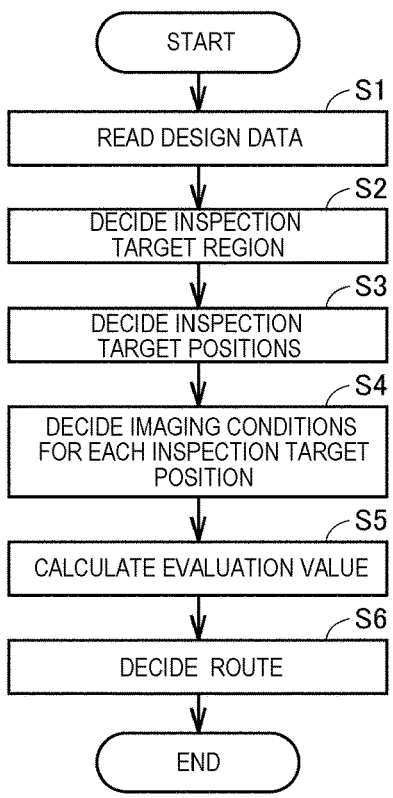
FIG. 7 is a flowchart illustrating an example of a flow of a process in the setting device illustrated in FIG. 1.

FIG. 7 is a flowchart illustrating an example of a flow of a process in the setting device 60. When it is necessary for the appearance inspection system 1 to inspect the appearance of a new product or a new type of workpiece W, the setting device 60 performs a process in accordance with, for example, the flowchart illustrated in FIG. 7 to set a change route of the imaging condition appropriate for the new product or the new type of workpiece W. The storage part 62 may store 3-dimensional design data indicating the designed surface of the new product or the new type of workpiece W in advance.

In the example illustrated in FIG. 7, the target position decision part 63 first reads the 3-dimensional design data from the storage part 62 in step S1. Subsequently, in step S2, the target position decision part 63 displays a schematic diagram of the designed appearance of the workpiece W indicated by the 3-dimensional design data on the display part 61 and decides an inspection target region on the workpiece W in accordance with an input by the user. At this time, on the premise that the workpiece W is placed at a pre-decided attitude at a pre-decided position on the stage 90, the target position decision part 63 converts a coordinate system of the 3-dimensional design data into an XYZ coordinate system that has a point on the stage 90 as the origin. Therefore, the inspection target region is expressed in the XYZ coordinate system that has the point on the stage 90 as the origin.

Subsequently, in step S3, the target position decision part 63 decides a plurality of inspection target positions from the inspection target region so that an inspection requirement corresponding to the inspection target region is satisfied.

Subsequently, in step S4, the imaging condition decision part 64 decides a plurality of imaging condition candidates including a relative position between the workpiece W and the imaging device 10 in the inspection for each of the plurality of inspection target positions.

Subsequently, in step S5, the route decision part 65 calculates a value (an evaluation value) of an evaluation function corresponding to the pre-decided requirement for each of a plurality of combination patterns which are candidates for the change route of the imaging condition. Each of the plurality of combination patterns is a pattern in which a plurality of imaging conditions selected one by one from the plurality of imaging condition candidates decided for each of the plurality of inspection target positions are arranged in the imaging order of the plurality of inspection target positions. In the plurality of combination patterns, the imaging order of the plurality of inspection target positions and at least one of the imaging conditions of at least one inspection target position are different from each other. The evaluation function includes, for example, a term that depends on a time (entire imaging time) necessary to complete imaging of all the plurality of inspection target positions while sequentially changing the imaging conditions including the relative position between the workpiece W and the imaging device 10. The evaluation value increases as the imaging time is longer.

Subsequently, in step S6, the route decision part 65 decides the change route of the imaging condition based on the evaluation value. For example, when the evaluation value is calculated by the evaluation function including the term that depends on the entire imaging time, the route decision part 65 decides the combination pattern in which the evaluation value is the minimum as the change route of the imaging condition.

In the foregoing example, the plurality of inspection target positions are decided from the inspection target region in step S3. However, the plurality of inspection target regions may be decided in step S2 and at least one inspection target position may be decided from each of the plurality of inspection target regions in step S3. Thus, the plurality of inspection target positions are also decided in step S3.

(D. Method of Deciding Inspection Target Region by Target Position Decision Part)

Figure 8:
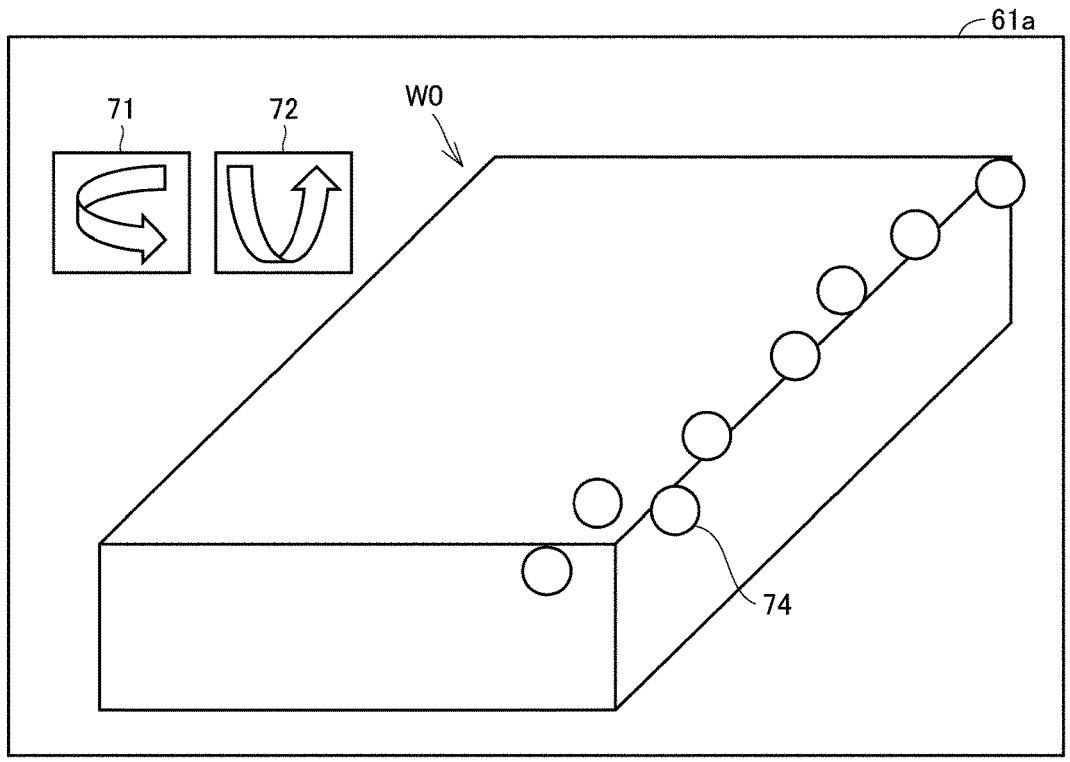
FIG. 8 is a diagram illustrating an example of a screen on which a schematic diagram of the designed appearance of the workpiece W is displayed.
Figure 9:
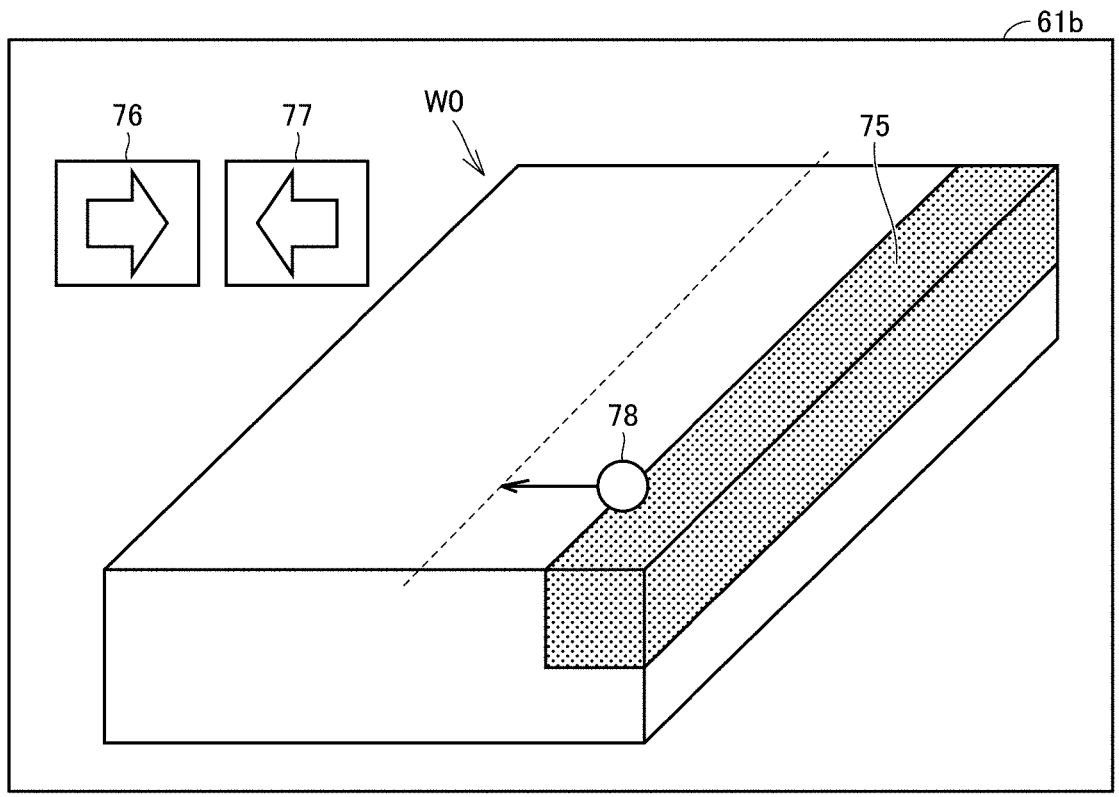
FIG. 9 is a diagram illustrating an example of a screen on which an inspection target region is displayed.

An example of a method of deciding the inspection target region by the target position decision part 63 will be described with reference to FIGS. 8 and 9. FIG. 8 is a diagram illustrating an example of a screen on which a schematic diagram of the designed appearance of the workpiece W is displayed. FIG. 9 is a diagram illustrating an example of a screen on which an inspection target region is displayed.

As illustrated in FIG. 8, the target position decision part 63 causes the display part 61 to display a screen 61a including a schematic diagram W0 of the designed appearance indicated by 3-dimensional design data of the workpiece W. The screen 61a includes a tool button 71 for rotating the schematic diagram W0 using the vertical direction as an axis and a tool button 72 for rotating the schematic diagram W0 using the horizontal direction as an axis. The user can appropriately rotate the schematic diagram W0 by operating the tool buttons 71 and 72.

The target position decision part 63 receives a designation of a position which the user desires to inspect. Specifically, the user uses the input device 167 to click a plurality of points which the user desires to inspect on the schematic diagram W0 of the workpiece W. On the screen 61a illustrated in FIG. 8, the plurality of points clicked by the user are indicated by circles 74.

The target position decision part 63 cuts a region including the plurality of circles 74 designated on the schematic diagram W0 as an inspection target region. Specifically, the target position decision part 63 obtains a range within a predetermined distance along the surface of the workpiece W from a point on the surface of the workpiece W corresponding to each of the designated circles 74 and cuts a union of the ranges as an inspection target region.

Further, the target position decision part 63 adjusts the inspection target region so that a contour line becomes a geometric figure such as a straight line or a circle. An inspection target region 75 adjusted so that the contour line becomes a straight line parallel to one ridge of the workpiece W is shown on a screen 61b of the display part 61 illustrated in FIG. 9.

Further, the target position decision part 63 receives an instruction of minute adjustment of the inspection target region 75 from the user and minutely adjusts the inspection target region 75 in response to the instruction. The screen 61b includes tool buttons 76 and 77 for expanding or contracting the inspection target region 75. The user inputs an instruction to expand or contract the inspection target region 75 using the input device 167 by selecting one side that forms the contour line of the inspection target region 75 and adjusting the tool buttons 76 and 77. Alternatively, the user may input an instruction to expand or contract the inspection target region 75 by dragging a point 78 on one side that forms the contour of the inspection target region 75 using a mouse including the input device 167. Thus, the target position decision part 63 expands or contracts the inspection target region 75. In this way, the target position decision part 63 decides the inspection target region 75. In the example illustrated in FIG. 9, a region in which partial regions of four surfaces among six surfaces of the rectangular parallelepiped workpiece W are aggregated is decided as the inspection target region 75.

(E. Method of Deciding Inspection Target Position by Target Position Decision Part)

Figure 10:
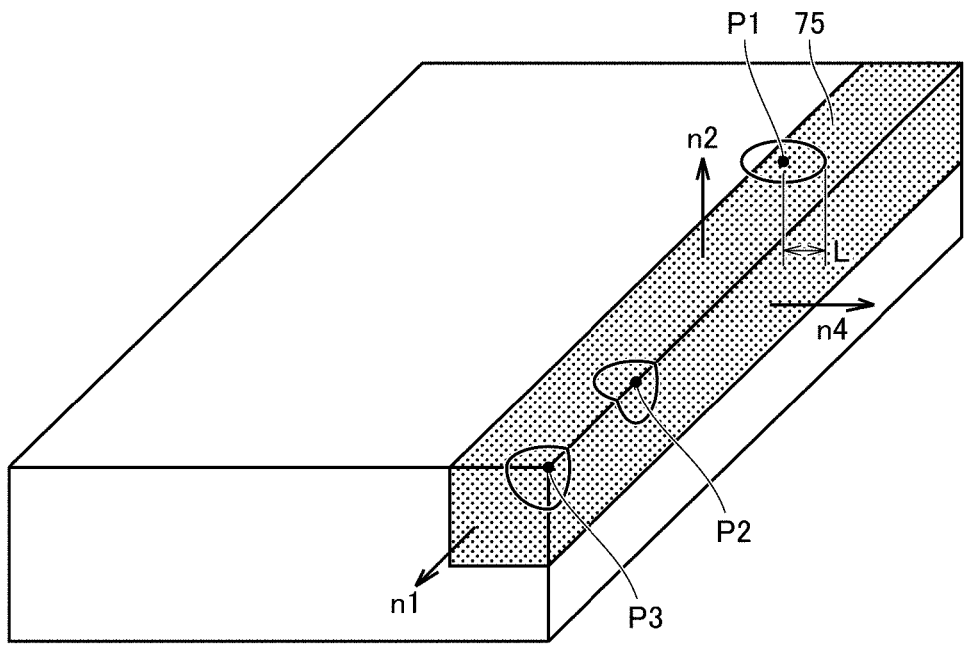
FIG. 10 is a diagram illustrating examples of points on the inspection target region.
Figure 11:
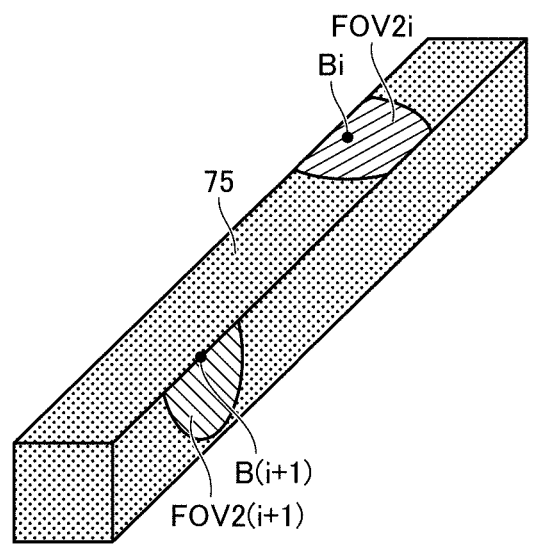
FIG. 11 is a diagram illustrating examples of inspection target positions decided from the inspection target regions and effective fields of view corresponding thereto.
Figure 12:
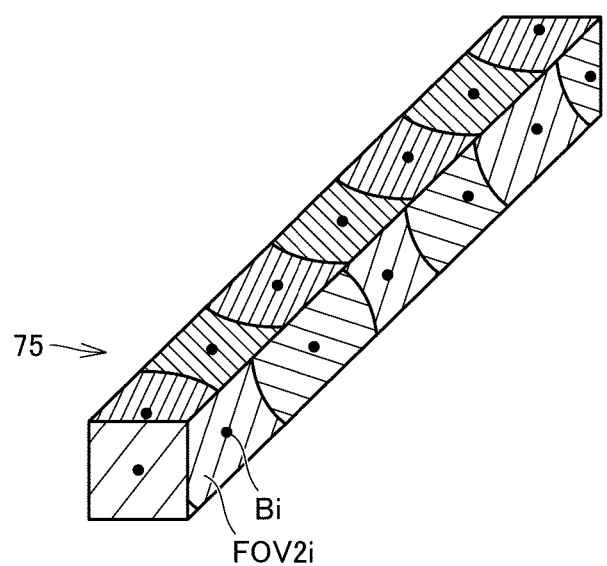
FIG. 12 is a diagram illustrating all the inspection target regions decided from the inspection target regions and effective fields of view.

An example of a method of deciding the inspection target position by the target position decision part 63 will be described with reference to FIGS. 10 to 12. FIG. 10 is a diagram illustrating examples of points on the inspection target region. FIG. 11 is a diagram illustrating examples of inspection target positions decided from the inspection target regions and effective fields of view corresponding thereto. FIG. 12 is a diagram illustrating all the inspection target regions decided from the inspection target regions and effective fields of view.

When R(pix) is a camera resolution and D(mm) is a required minimum defect size, a maximum imaging field of view FOV by the imaging device 10 at which an inspection requirement that a defect of the minimum defect size can be recognized can be satisfied is set. A diameter of the imaging field of view FOV is generally expressed as a×D×R using a constant a of proportionality.

The target position decision part 63 can regard the inspection target region 75 as a set of points and examine a 3-dimensional shape near a point within the inspection target region 75 using a distribution of normal vectors. For example, based on the 3-dimensional design data of the workpiece W, the target position decision part 63 obtains the distribution of the normal vectors in a range within a distance L along the surface from the point within the inspection target region 75. The distance L is, for example, a value (=b×a×D×R) obtained by multiplying the diameter (=a×D×R) of the imaging field of view FOV by a constant b of proportionality.

In the example illustrated in FIG. 10, the vicinity of a point P1 is flat. Therefore, normal vectors in the range within the distance L along the surface of the workpiece W from the point P1 are all a vector n2. A point P2 is located near a ridge in which two surfaces meet. Therefore, normal vectors in the range within the distance L along the surface of the workpiece W from the point P2 include two vectors n2 and n4. The point P2 is located near a vertex at which three surfaces meet. Therefore, normal vectors in the range within the distance L along the surface of the workpiece W from the point P3 include three vectors n1, n2, and n4. Accordingly, the target position decision part 63 can determine whether the vicinity of a point is flat, or there is a ridge near the point, or there is a ridge near the point in accordance with the distribution of the normal vectors in the range within the distance L along the surface from the point within the inspection target region 75.

As illustrated in FIG. 11, the target position decision part 63 selects one point at random as an inspection target position Bi in the inspection target region 75. The target position decision part 63 obtains an effective field of view FOV2$i$ by the imaging device 10 with respect to the inspection target position Bi. The effective field of view FOV2$i$ is a field of view which includes the inspection target position Bi and in which the imaging device 10 can perform imaging and inspection using one imaging condition. The target position decision part 63 decides the effective field of view FOV2$i$ in accordance with the 3-dimensional shape near the inspection target position Bi. A maximum diameter of the effective field of view FOV2$i$ is set to the diameter (=a×D×R) of the imaging field of view FOV.

For example, the target position decision part 63 decides the effective field of view FOV2$i$ so that a variation in the normal vector distribution in the effective field of view FOV2$i$ is within a predetermined range. When the near of the inspection target position Bi is flat, the target position decision part 63 decides a range within the distance a×D×R along the surface from the inspection target position Bi (that is, the imaging field of view FOV) as the effective field of view FOV2$i$. On the other hand, when there is a ridge or a vertex near the inspection target position Bi, as illustrated in FIG. 11, the target position decision part 63 sets a range excluding a partial range from the range within the distance a×D×R along the surface from the inspection target position Bi as the effective field of view FOV2$i$. The excluded range is a range of the surface that has normal vectors except for a normal vector indicating a maximum distribution amount in the normal vector distribution.

Subsequently, the target position decision part 63 removes a set of points belonging to the decided effective field of view FOV2$i$ from a set of points belonging to the inspection target region 75 and selects one point selected at random from a set of the remaining points as a subsequent inspection target position B($i$+1). The target position decision part 63 also decides an effective field of view FOV2($i$+1) of the selected inspection target position B($i$+1). The target position decision part 63 repeats this process until the set of the points belonging to the inspection target region 75 is 0. Thus, as illustrated in FIG. 12, the plurality of inspection target positions Bi (where i=1, 2, . . . ) are decided from the inspection target region 75. All the points in the inspection target region 75 are included in one effective field of view FOV2$i$ among the plurality of inspection target positions Bi (where i=1, 2, . . . ). As described above, the maximum diameter of the effective field of view FOV2$i$ is set to the diameter of the imaging field of view FOV. Therefore, the inspection target position at which a defect of the minimum defect size can be recognized in the entire inspection target region 75 is decided.

As described above, the target position decision part 63 extracts the inspection target position Bi at random from the inspection target region 75. However, the target position decision part 63 may extract the inspection target position Bi from the inspection target region 75 in accordance with a pre-decided geometrical condition. Alternatively, the target position decision part 63 may extract the inspection target position Bi from the inspection target region 75 so that the plurality of extracted inspection target positions Bi are regularly arranged.

For example, when a defect easily occurs near a ridge or a vertex on the workpiece W, the inspection target position may be decided so that an inspection requirement that the vicinity of the ridge or the vertex be preferentially inspected is satisfied. For example, the inspection target position Bi may preferentially be extracted from a set of points at which there is a ridge or a vertex within a predetermined distance in the inspection target region 75.

(F. Method of Deciding Imaging Condition by Imaging Condition Decision Part)

Figure 13:
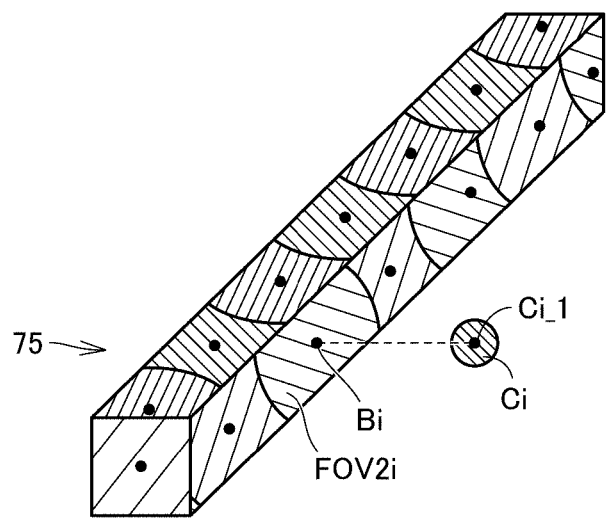
FIG. 13 is a diagram illustrating an example of a method of deciding an imaging condition candidate by an imaging condition decision part illustrated in FIG. 1.

FIG. 13 is a diagram illustrating an example of a method of deciding an imaging condition candidate by the imaging condition decision part 64. The imaging condition decision part 64 decides each of a plurality of positions in a relative position candidate group Ci centering on a relative position candidate Ci_1 on a normal line of the designed appearance surface of the workpiece W at the inspection target position Bi as a relative position candidate of the imaging device 10 with respect to the workpiece W. The imaging condition decision part 64 may decide a plurality of imaging condition candidates φ1_1 and φ1_2, and the like respectively including the plurality of decided relative position candidates Ci_1, Ci_2, and the like. An imaging condition candidate group φ1 at the inspection target position Bi is formed by the plurality of decided imaging condition candidates φ1_1 and φ1_2, and the like.

The relative position candidate Ci_1 is a position at which the effective field of view FOV2i corresponding to the inspection target position Bi can be imaged and which is away from the inspection target position by an optimum subject distance which is in focus on the inspection target position Bi. The relative position candidate group Ci is decided from a depth of field and an allowable inclination range. The allowable inclination range is an allowable range (for example, ±20°) of an angle formed between the optical axis of the camera 11 and the normal direction of the surface of the workpiece W at the inspection target position Bi.

Note that the imaging condition decision part 64 may decide each of a plurality (finite number) of positions arranged at intervals as a relative position candidate in the relative position candidate group Ci.

When the image sensor 13 is rectangular and the effective field of view FOV2i is circular, the relative position candidate group Ci is decided so that the effective field of view FOV2i is included (circumscribed) in the imaging range of the rectangular state of the imaging device 10.

Figure 14A:
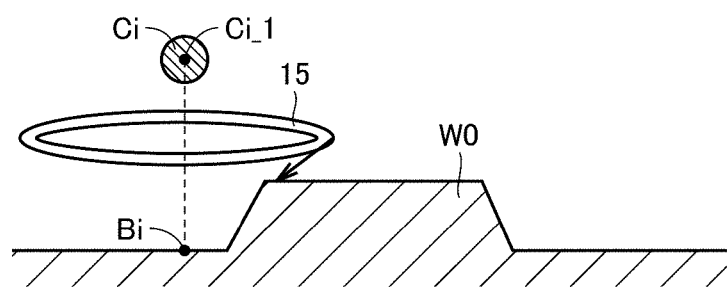
FIG. 14(a) and FIG. 14(b) are diagrams illustrating another example of a method of deciding an imaging condition candidate group by the imaging condition decision part illustrated in FIG. 1.
Figure 14B:
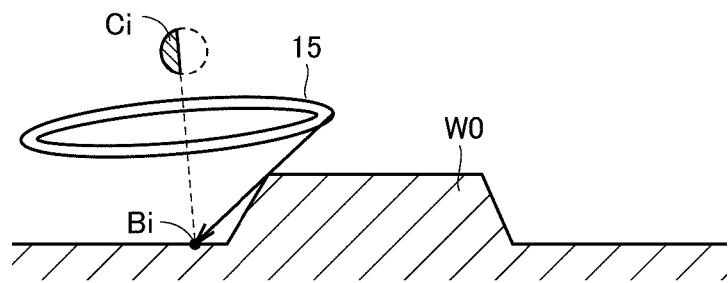

FIG. 14(a) and FIG. 14(b) are diagrams illustrating another example of a method of deciding an imaging condition candidate group by the imaging condition decision part 64. FIG. 14(a) and FIG. 14(b) illustrate an example of a method of deciding the imaging condition candidate in the imaging device 10 including the ring type illumination part 15.

When there is a projection on the designed surface of the workpiece W near the inspection target position Bi, a part of the light radiated from the illumination part 15 is blocked by the projection and does not arrive at the inspection target position Bi. In this case, a radiation condition of the inspection target position Bi is changed, and thus there is a possibility of normal appearance inspection not being performed. Accordingly, the imaging condition decision part 64 may decide the relative position candidate group Ci in consideration of the designed shape of the workpiece W near the inspection target position Bi.

FIG. 14(a) illustrates the relative position candidate group Ci decided without considering a change in the radiation condition due to the projection which is near the inspection target position Bi. In this case, when the imaging device 10 is disposed at some of the positions in the relative position candidate group Ci, a part of the light radiated from the illumination part 15 is blocked by the projection.

Accordingly, the imaging condition decision part 64 generates the relative position candidate group Ci formed by the position of the imaging device 10 at which the light radiated from the illumination part 15 is not blocked by the projection by simulating the light radiated from the illumination part 15 based on the 3-dimensional design data of the workpiece W. Specifically, the imaging condition decision part 64 generates a new relative position candidate group Ci by removing the position of the imaging device 10 at which the light radiated from the illumination part 15 is blocked by the projection from the relative position candidate group Ci illustrated in FIG. 14(a). The imaging condition decision part 64 may remove the position of the imaging device 10 at which there is the designed surface of the workpiece W on a line segment connecting one point of the illumination part 15 to the inspection target position Bi from the relative position candidate group Ci. FIG. 14(b) illustrates the relative position candidate group Ci decided in consideration of the designed shape of the workpiece W near the inspection target position Bi.

The imaging condition decision part 64 may generate the new relative position candidate group Ci by removing some of the positions from the relative position candidate group Ci illustrated in FIG. 14(a) in accordance with a rule decided in advance by an experiment without simulating the light radiated from the illumination part 15. The rule is, for example, a rule in which a position on the projection side is removed from a flat surface set in accordance with the projection from the relative position candidate group Ci illustrated in FIG. 14(a) when there is a projection within a predetermined distance from the inspection target position Bi. Here, the flat surface set in accordance with the projection is, for example, a flat surface which passes through the inspection target position Bi and is inclined at a predetermined angle to an opposite side to the projection in the normal direction of the inspection target position Bi.

Further, the imaging condition decision part 64 may decide the imaging condition candidate including at least one of the illumination condition of the illumination part 15, the optical condition of the lens part 14, and the control condition of the camera control part 12 along with the relative position candidate of the imaging device 10 with respect to the workpiece W.

Further, when the relative position between the camera 11 and the illumination part 15 is variable, the imaging condition decision part 64 may decide the imaging condition candidate including at least one of a relative position between the camera 11 and the illumination part 15 and an attitude of the illumination part 15 with respect to the camera 11 along with the relative position candidate of the imaging device 10 with respect to the workpiece W. As illustrated in FIG. 14(a), when there is a projection near the inspection target position Bi, the imaging condition candidate including a position and an attitude which the illumination part 15 can be disposed so that the radiated light is not blocked by the projection is decided for each relative position candidate of the imaging device 10 with respect to the workpiece W. For example, the light radiated from the illumination part 15 is not blocked by the projection by locating the illumination part 15 away from the inspection target position Bi.

(G. Method of Deciding Change Route by Route Decision Part)

Next, an example of a method of deciding a change route of the imaging condition by the route decision part 65 will be described. The route decision part 65 calculates an evaluation value E using an evaluation function (1) expressed below for each of a plurality of combination patterns which are candidates for the change route of the imaging condition.

[Math. 1]

$$E = \Sigma(f(\phi i, \phi j)) \qquad (1)$$

As described above, the plurality of combination patterns are patterns in which the plurality of imaging conditions selected one by one from the imaging condition candidate group φi decided for each of the plurality of inspection target positions Bi are arranged in the imaging order of the plurality of inspection target positions Bi. Therefore, when there are n inspection target positions and Ki imaging condition candidates are decided for the inspection target position Bi, the number of combination patterns is (n×(n−1)× . . . 2×1)×Kn×K(n−1)× . . . ×K2×K1.

In the evaluation function (1), f(ϕi, ϕj) indicates a time necessary for a change from the imaging condition corresponding to the inspection target position Bi imaged earlier between two inspection target positions continuous in the imaging order in the corresponding combination pattern to the imaging condition corresponding to the inspection target position Bj imaged later. The evaluation value E indicates a sum of the times at the two inspection target positions continuous in the imaging order in the corresponding combination pattern. That is, the evaluation value E indicates a time necessary to complete the imaging of all the inspection target positions Bi while sequentially changing the imaging condition.

The route decision part 65 decides the combination pattern in which the evaluation value E is the minimum as a change route of the imaging condition. Thus, the change route satisfying a requirement that the time necessary to complete all the imaging while sequentially changing the imaging condition including the relative position between the workpiece W and the imaging device 10 be the minimum is automatically decided.

Here, f(ϕi, ϕj) is decided in advance in accordance with a control condition or the like of the robot 30. For example, in the case of a control condition that the imaging device 10 is temporarily stopped at each inspection target position Bi, f(ϕi, ϕj) in which a speed of each arm 32 of the robot 30 at the time of achieving the imaging condition is 0 is decided. Alternatively, in the case of a control condition that the imaging device 10 is continuously operated at each inspection target position Bi without being stopped, f(ϕi, ϕj) in which there is no restriction on a speed of the arm 32 at the time of achieving the imaging condition is decided.

The imaging condition may include one parameter or may include a plurality of parameters. As described above, when XYZ coordinates are used as parameters for specifying the relative position of the imaging device 10 with respect to the workpiece W and θx, θy, and θz are used as parameters for specifying the attitude of the imaging device 10 with respect to the workpiece W, the imaging condition includes at least the six parameters.

When the imaging condition includes a plurality of parameters, the evaluation function may include a term that varies in accordance with a value of a specific parameter. For example, for a parameter indicating an angle formed between the optical axis of the camera 11 and a normal direction of the surface of the workpiece W at the inspection target position (hereinafter referred to as an inclination angle), an evaluation function (2) below is decided so that an evaluation value at an inclination angle of 20° is higher than at an inclination angle of 0°.

[Math. 2]

$$E = \Sigma(f(\phi ik, \phi jl)) + \Sigma(g(\phi ik)) \quad (2)$$

In the evaluation function (2), an element number indicating a type of parameter is expressed by a suffix k or l. The second term of the evaluation function (2) is a term that varies in accordance with a value of a parameter indicating an inclination angle.

Figure 15:
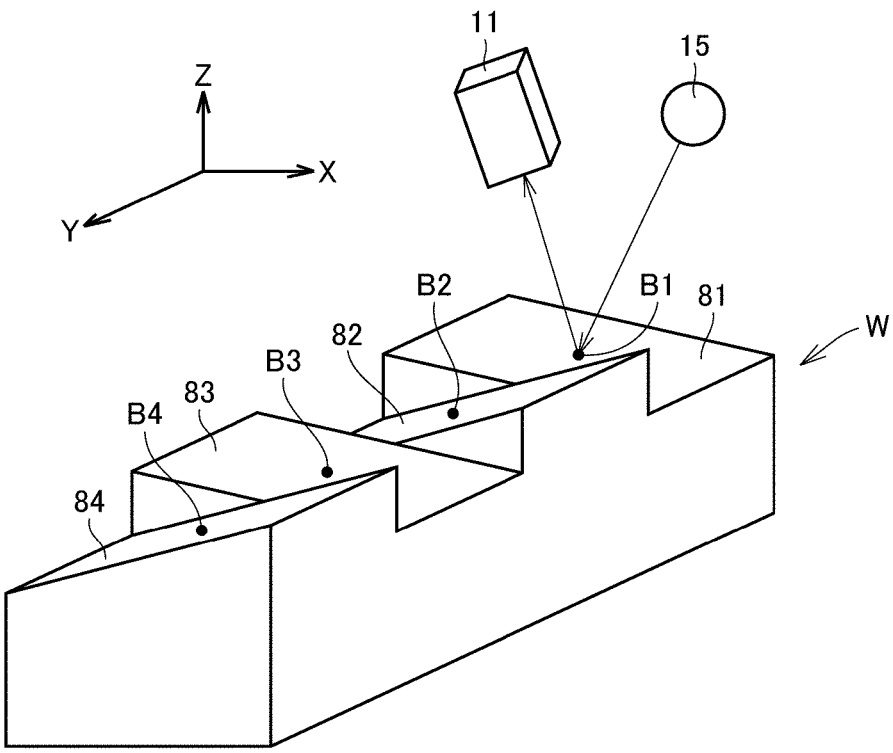
FIG. 15 is a diagram illustrating an example of the designed appearance of the workpiece W.

FIG. 15 is a diagram illustrating an example of the designed appearance of the workpiece W. In the example illustrated in FIG. 15, the upper surface of the workpiece W includes four flat surfaces 81 to 84. The flat surfaces 81 to 84 are arranged in this order along the Y axis. The flat surfaces 81 and 83 are parallel to the Y axis and are located on the same plane on which the Z coordinate decreases in proportion to the X coordinate. The flat surfaces 82 and 84 are parallel to the Y axis and are located on the same plane on which the Z coordinate increases in proportion to the X coordinate. In the example illustrated in FIG. 15, central points of the flat surfaces 81 and 84 are decided at the inspection target positions B1 to B4, respectively.

Figures 16A, 16B:
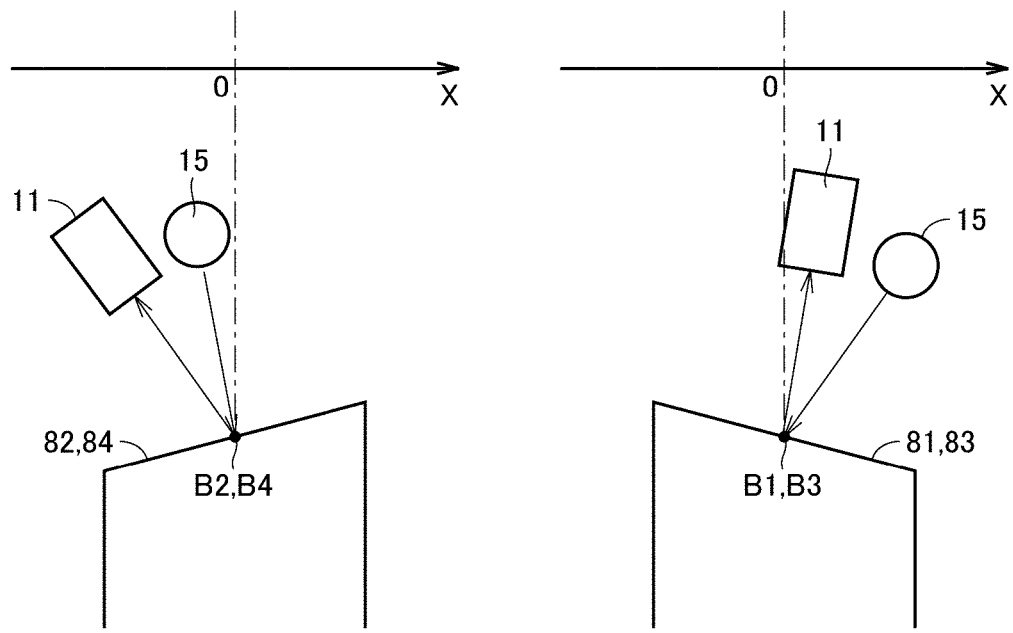
FIG. 16(a) and FIG. 16(b) are diagrams illustrating examples of the position of the imaging device in the example illustrated in FIG. 4 when the inspection target positions illustrated in FIG. 15 are imaged.

FIG. 16(a) and FIG. 16(b) are diagrams illustrating examples of the position of the imaging device 10 in the example illustrated in FIG. 4 when the inspection target positions B1 to B4 illustrated in FIG. 15 are imaged. FIG. 16(a) illustrates a position of the imaging device 10 corresponding to the inspection target positions B2 and B4. FIG. 16(b) illustrates a position of the imaging device 10 corresponding to the inspection target positions B1 and B3. As illustrated in FIG. 16(a) and FIG. 16(b), when X coordinates of the inspection target positions B1 to B4 are set to 0, the X coordinates of the camera 11 and the illumination part 15 are negative with respect to the inspection target positions B2 and B4. On the other hand, the X coordinates of the camera 11 and the illumination part 15 are positive with respect to the inspection target positions B1 and B3. Since the illumination part 15 is located in the forward direction of the X axis than the camera 11, the X coordinate of the illumination part 15 is greater than the X coordinate of the camera 11.

Figure 17:
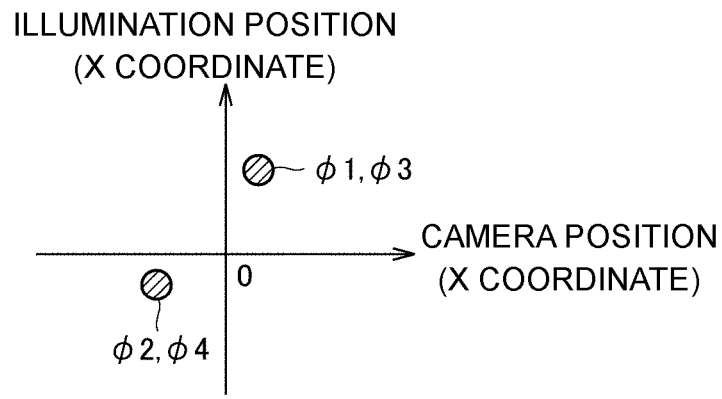
FIG. 17 is a diagram illustrating a distribution of X coordinates of a camera and an illumination part included in the imaging condition candidate groups decided for each of the inspection target positions.

FIG. 17 is a diagram illustrating a distribution of X coordinates of the camera 11 and the illumination part 15 included in the imaging condition candidate groups ϕ1 to ϕ4 decided for each of the inspection target positions B1 to B4. As illustrated in FIG. 15, the inspection target positions B1 to B4 are disposed at an equal interval along the Y axis. Therefore, the Y coordinates of the camera 11 and the illumination part 15 included in the imaging condition candidate groups ϕ1 to ϕ4 increase in this order. In the imaging condition candidate groups ϕ1 to ϕ4, a variation in the Y coordinates of the camera 11 and the illumination part 15 is greater than a variation in the X coordinates and the Z coordinates of the camera 11 and the illumination part 15. Therefore, the evaluation value E for a combination pattern in which the imaging conditions selected from each of the imaging condition candidate groups ϕ1 to ϕ4 are arranged in this order is the smallest.

Figure 18:
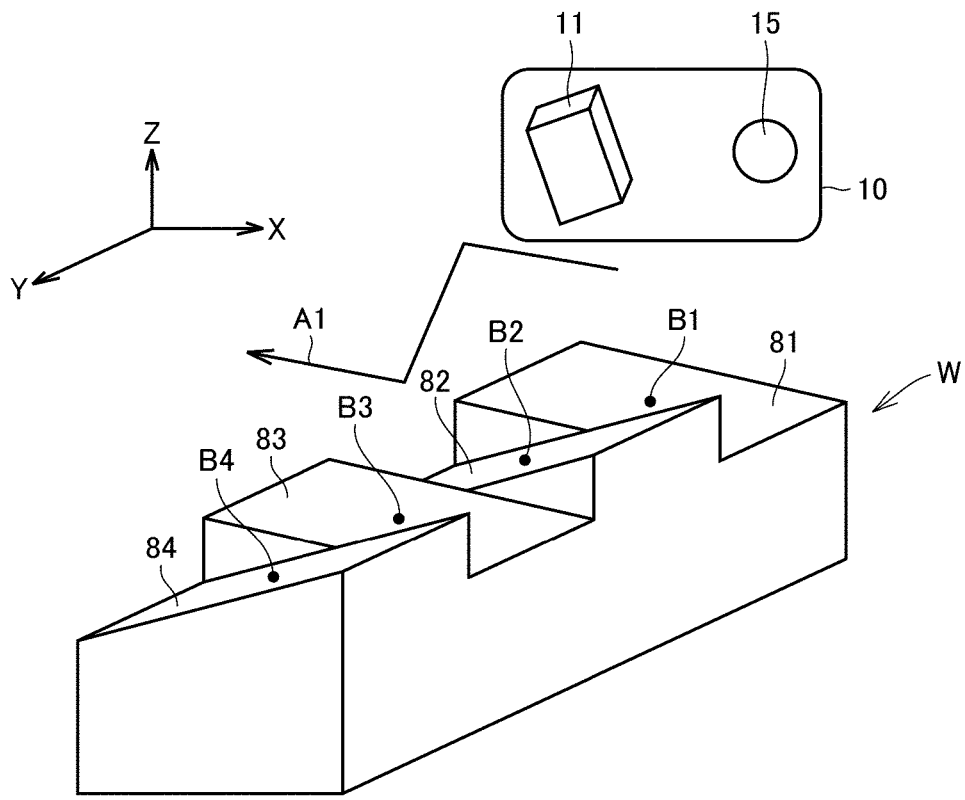
FIG. 18 is a diagram illustrating an example of a change route of an imaging condition decided by the route decision part when the imaging device in the example illustrated in FIG. 4 is used.

FIG. 18 is a diagram illustrating an example of a change route A1 of an imaging condition decided by the route decision part 65 when the imaging device 10 in the example illustrated in FIG. 4 is used. As illustrated in FIG. 18, along the change route A1 of the imaging condition, the imaging device 10 moves in zigzags in the Y axis direction while being shaken in the X axis direction.

FIG. 19(a) and FIG. 19(b) are diagrams illustrating an example of the position of the imaging device 10 in the example illustrated in FIG. 5 when the inspection target positions B1 to B4 illustrated in FIG. 15 are imaged. In the imaging device 10 in the example illustrated in FIG. 5, the illumination elements that are turned on can be selected among the plurality of illumination elements 16a to 16f. Therefore, as illustrated in FIG. 19(a), the X coordinate of the camera 11 can be set to 0 by turning the illumination element 16b on. As illustrated in FIG. 19(b), the X coordinate of the camera 11 can be set to 0 by turning the illumination element 16e on.

FIG. 20 is a diagram illustrating a distribution of U coordinates of a lighting illumination element and X coordinates of the camera 11 included in the imaging condition candidate groups ϕ1 to ϕ4 decided for each of the inspection target positions B1 to B4. As illustrated in FIG. 20, in the imaging device 10 in the example illustrated in FIG. 5, the degree of freedom of the X coordinate of the camera 11 is improved. Therefore, the route decision part 65 can generate a combination pattern in which the imaging conditions are selected one by one from the imaging condition candidate groups φ1 to φ4 so that the X coordinate of the imaging device 10 is constant. Then, the evaluation value E for the combination pattern is the smallest.

Figure 21:
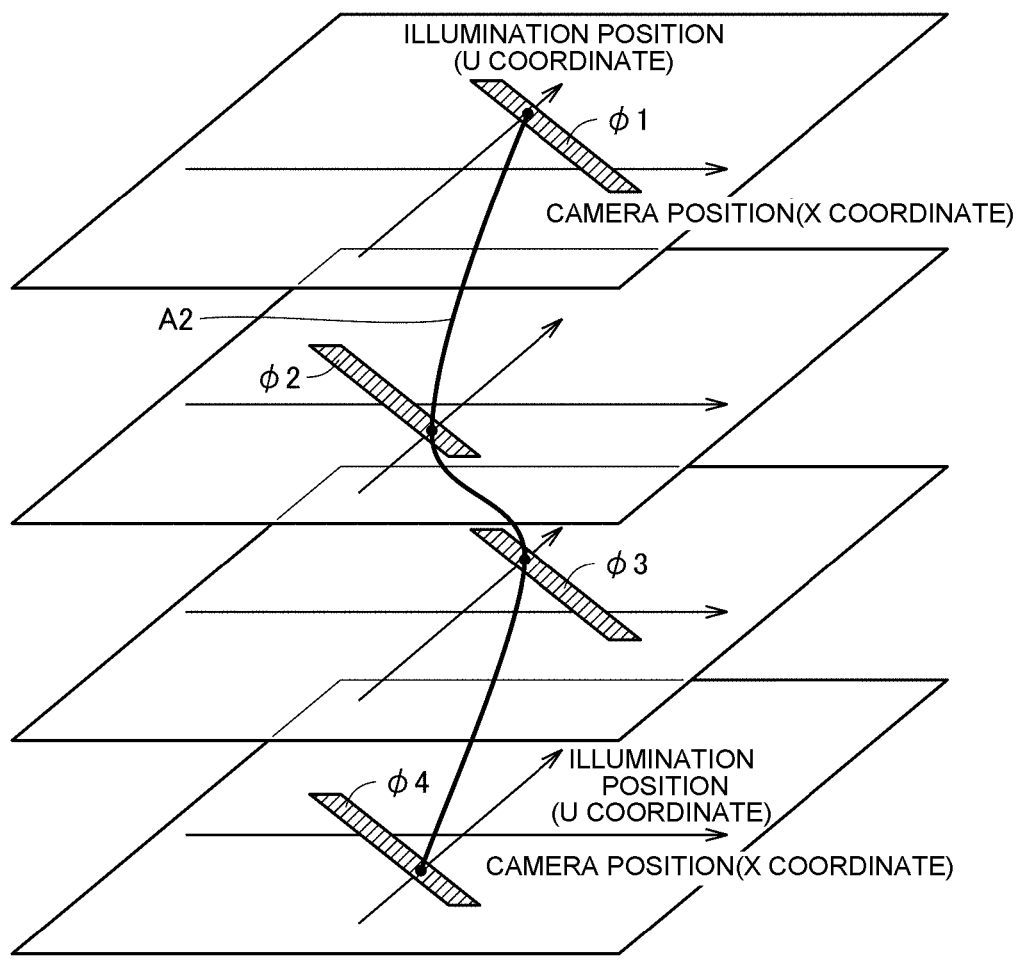
FIG. 21 is a diagram illustrating an example of a change route of the imaging condition decided by the route decision part when the imaging device in the example illustrated in FIG. 5 is used.

FIG. 21 is a diagram illustrating an example of a change route A2 of the imaging condition decided by the route decision part 65 when the imaging device 10 in the example illustrated in FIG. 5 is used. As illustrated in FIG. 21, along the change route A2 of the imaging condition, the imaging device 10 is not shaken in the X axis direction by changing the illumination element that is turned on.

When the number of accelerations or decelerations of the arms 32 of the robot 30 is large, a lifetime of the robot 30 decreases due to an increase in a load of a driving system. For example, in the case of the change route A1 illustrated in FIG. 18, the number of accelerations or decelerations in the X axis direction increases. Accordingly, the route decision part 65 may calculate the evaluation value E using an evaluation function (3) below. In the evaluation function (3), the second term is a term related to the number of accelerations or decelerations of the arms 32. Here, a and b are constants of proportionality.

[Math. 3]

$$E = a \times \Sigma(f(\phi i, \phi j)) + b \times (\text{Number of accelerations or decelerations}) \quad (3)$$

The route decision part 65 can decide a combination pattern satisfying a requirement that the number of accelerations or decelerations of the arms 32 be small as a change route of the imaging condition by calculating the evaluation value E using the evaluation function (3).

Figure 22:
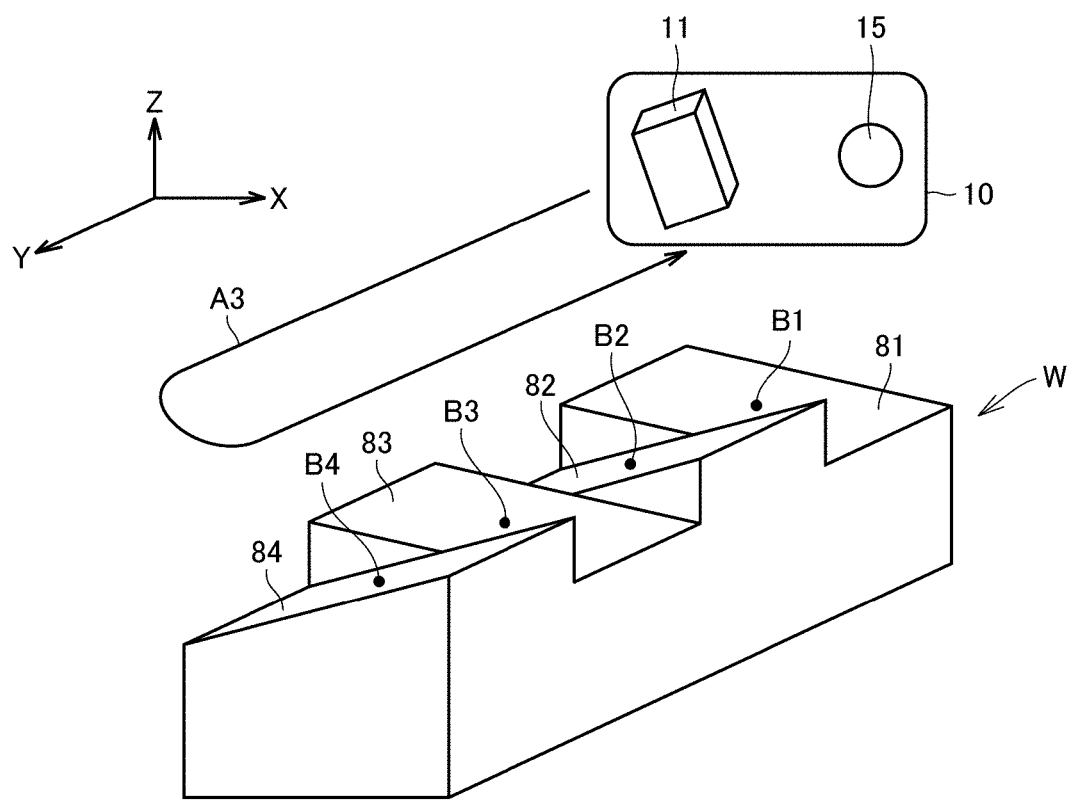
FIG. 22 is a diagram illustrating an example of a change route of the imaging condition decided by the route decision part when an evaluation function (3) is used.

FIG. 22 is a diagram illustrating an example of a change route A3 of the imaging condition decided by the route decision part 65 when the evaluation function (3) is used. As illustrated in FIG. 22, along the change route A3 of the imaging condition, the imaging device 10 is moved to image the inspection target positions B2, B4, B3, and B1 in this order. As a result, the number of accelerations or decelerations in the X axis direction is small.

(H. Image Processing Device)

The image processing device 20 includes a central processing unit (CPU), a random access memory (RAM), a read-only memory (ROM), an auxiliary storage device, and a communication I/F and performs information processing. The auxiliary storage device includes, for example, a hard disk drive, a solid-state drive, or the like and stores a program or the like to be executed by the CPU.

The image processing device 20 processes an image obtained by imaging the inspection target position and outputs a quality determination result of the inspection target position. The determination part 21 of the image processing device 20 determines quality of the inspection target position by binarizing a differential image from an image of a good workpiece stored in advance and combining a reference value and the number of pixels exceeding a threshold, as disclosed in, for example, Japanese Patent Application Laid-Open No. 2007-240434. The output part 22 of the image processing device 20 displays the determination result on a display device (not illustrated). Alternatively, the image processing device 20 may display a quality result on the display part 61 included in the setting device 60.

As described above, when the image sensor 13 is rectangular and the effective field of view FOV2$i$ is circular, the relative position is decided so that the effective field of view FOV2$i$ is included (circumscribed) in the imaging range of the rectangular state of the imaging device 10. Therefore, an image captured by the imaging device 10 includes a region other than the effective field of view FOV2$i$. In the embodiment, the determination part 21 may extract only a portion equivalent to the effective field of view FOV2$i$ in the image and perform image processing on only the extracted partial image. Thus, it is possible to improve a processing speed of the determination part 21.

The determination part 21 of the image processing device 20 may determine quality of each inspection target region based on the images captured for the inspection target positions in the inspection target region. The output part 22 of the image processing device 20 may output a determination result of the quality of the inspection target region. Alternatively, the determination part 21 may determine quality of the appearance of the entire workpiece W. The output part 22 may output a determination result of the quality of the workpiece W. Alternatively, the output part 22 may output quality determination results of at least two of the inspection target position, the inspection target region, and the workpiece W.

(I. Modification Examples of Appearance Inspection System)

Figure 23:
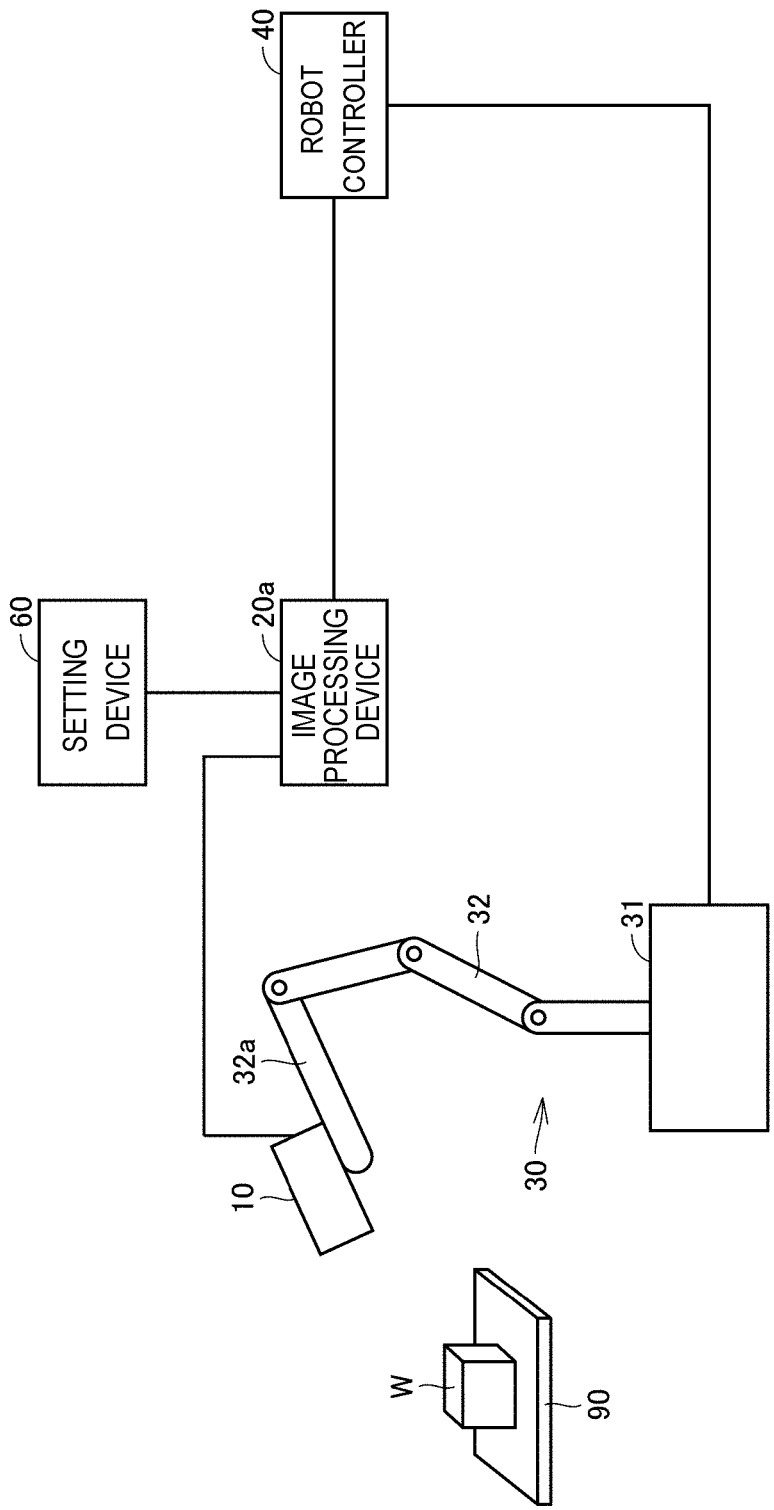
FIG. 23 is a diagram illustrating an appearance inspection system according to a modification example.

FIG. 23 is a diagram illustrating an appearance inspection system according to a modification example. The appearance inspection system illustrated in FIG. 23 is different from the appearance inspection system 1 illustrated in FIG. 1 in that the PLC 50 is not included and an image processing device 20$a$ is included instead of the image processing device 20. The image processing device 20$a$ has both the configuration of the foregoing image processing device 20 and the configuration of the PLC 50.

Figure 24:
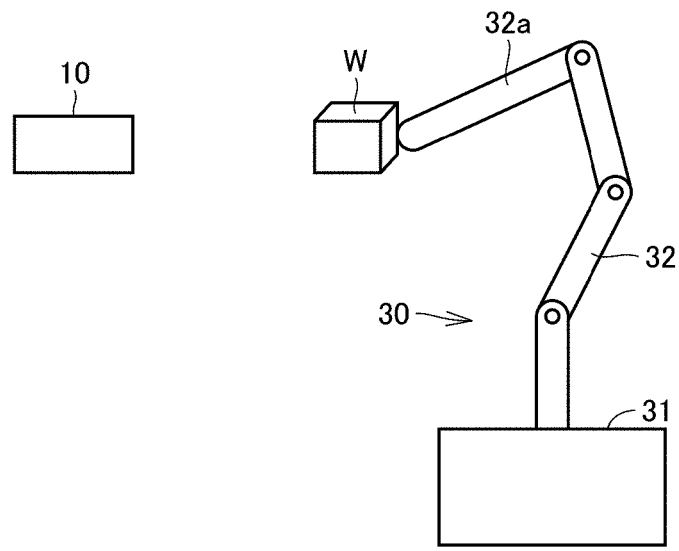
FIG. 24 is a diagram illustrating another form in which a relative position between a workpiece and the imaging device is changed.

FIG. 24 is a diagram illustrating another form in which a relative position between the workpiece W and the imaging device 10 is changed. As illustrated in FIG. 24, the robot 30 may move the workpiece W rather than the imaging device 10. In the example illustrated in FIG. 24, the imaging device 10 is fixed. The relative position between the workpiece W and the imaging device 10 may be changed by moving the workpiece W in this way.

Figure 25:
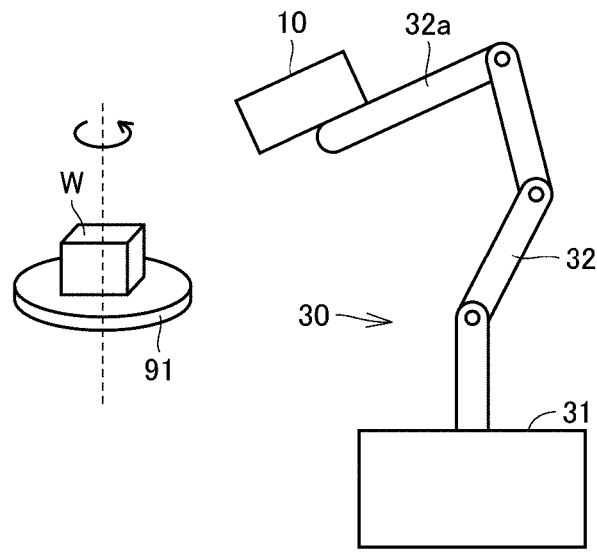
FIG. 25 is a diagram illustrating still another form in which the relative position between the workpiece and the imaging device is changed.

FIG. 25 is a diagram illustrating still another form in which the relative position between the workpiece W and the imaging device 10 is changed. As illustrated in FIG. 25, the workpiece W may be placed on a rotational table 91. The rotational table 91 rotates in response to an instruction from the robot controller 40. Thus, it is possible to easily change the relative position between the workpiece W and the imaging device 10.

The robot 30 may be a robot (for example, a horizontally articulated robot or an orthogonal robot) other than a vertically articulated robot.

The imaging field of view FOV and the effective field of view FOV2 are circular, as described above. However, the shapes of the imaging field of view FOV and the effective field of view FOV2 are not limited to the circle and may be rectangular (oblong or square), for example.

(J. Operation Effects and Results)

As described above, in the embodiment, a change route of the imaging condition for sequentially imaging the plurality of inspection target positions is decided by selecting one imaging condition candidate among the plurality of imaging condition candidates so that a pre-decided requirement is satisfied.

Thus, when it is necessary to inspect the appearance of a new product or a new type of target, the change route of the imaging condition satisfying the pre-decided requirement is automatically decided by the appearance inspection system 1. As a result, it is possible to reduce labor of setting the condition by a designer when the plurality of inspection target positions on the workpiece W are sequentially imaged.

The imaging condition may include at least one of an illumination condition of the illumination part 15, an optical condition of the lens part 14, and a control condition of the camera control part 12.

The route decision part 65 calculates an evaluation value of each of a plurality of combination patterns in which at least one of an imaging order of the plurality of inspection target positions and the imaging condition of one inspection target position is mutually different and decides the change route based on the evaluation value. Thus, the change route of the imaging condition is automatically set through the calculation of the evaluation value.

The evaluation value is calculated using the evaluation function including a term that depends on a time necessary to complete imaging of all the plurality of inspection target positions while sequentially changing the imaging condition. Thus, it is possible to automatically set the change route of the imaging condition of the short entire imaging time.

The target position decision part 63 sets one or more inspection target regions on the workpiece W and decides one or more inspection target positions corresponding to the inspection target region so that an inspection requirement corresponding to the inspection target region is satisfied. Thus, it is possible to automatically decide the inspection target position among the inspection target region which is desired to be inspected.

The image processing device 20 includes the output part 22 and the determination part 21 that processes an image captured under the imaging condition decided to correspond to each of the plurality of inspection target positions. The output part 22 outputs at least one of a determination result of quality of each of the plurality of inspection target positions, a determination result of quality of the inspection target region, and a determination result of quality of the workpiece W. Thus, the user can easily recognize quality of the appearance of the workpiece W.

(K. Supplements)

As described above, the embodiments and the modification examples include the following disclosure.

(Configuration 1)

An appearance inspection system (1) that performs appearance inspection by imaging a target (W) using an imaging device (10) while causing a relative position between the target (W) and the imaging device (10) to be different, the appearance inspection system (10) including:

a first decision part (64) that decides one imaging condition candidate or a plurality of imaging condition candidates including the relative position between the target (W) and the imaging device (10) in the inspection for each of a plurality of inspection target positions (Bi) on the target (W), wherein the first decision part (64) decides a plurality of imaging condition candidates for at least one inspection target position among the plurality of inspection target positions (Bi), and wherein the appearance inspection system (1) further includes a second decision part (65) that decides a change route of the imaging condition for sequentially imaging the plurality of inspection target positions (Bi) by selecting the one imaging condition candidate or one of the plurality of imaging condition candidates decided for each of the plurality of inspection target positions (Bi) as an imaging condition so that a pre-decided requirement is satisfied.

(Configuration 2)

The appearance inspection system (1) according to Configuration 1, wherein the imaging device (10) includes an illumination part (15) that radiates light to the target (W), a lens part (14) that forms an image from light reflected from the target on an image sensor (13), and a camera control part (12) that controls the image sensor (13) to output image data, and wherein the imaging condition includes at least one of an illumination condition of the illumination part (15), an optical condition of the lens part (14), and a control condition of the camera control part (12).

(Configuration 3)

The appearance inspection system (1) according to Configuration 1 or 2, wherein the second decision part (65) calculates an evaluation value of each of a plurality of combination patterns in which at least one of an imaging order of the plurality of inspection target positions (Bi) and the imaging condition decided for the plurality of inspection target positions (Bi) is mutually different and decides the change route based on the evaluation value.

(Configuration 4)

The appearance inspection system (1) according to Configuration 3, wherein the evaluation value is calculated using an evaluation function including a term that depends on a time necessary to complete imaging of all the plurality of inspection target positions (Bi) while sequentially changing the imaging condition.

(Configuration 5)

The appearance inspection system (1) according to any one of Configurations 1 to 4, further including:

a third decision part (63) that sets one or more inspection target regions (75) on the target (W) and decides one or more inspection target positions (Bi) corresponding to the inspection target region (75) so that an inspection requirement corresponding to the inspection target region (75) is satisfied.

(Configuration 6)

A setting device (60) that is used in the appearance inspection system (1) according to any one of Configurations 1 to 5 and sets the change route, the setting device (60) including:

the first decision part (64) and the second decision part (65).

(Configuration 7)

An image processing device (20) that is used in the appearance inspection system (1) according to any one of Configurations 1 to 5 and determines quality of an appearance of the target (W), the image processing device (20) including:

a determination part (21) that determines quality of the appearance of the target (W) by processing an image captured on an imaging condition decided for each of the plurality of inspection target positions (Bi); and an output part (22) that outputs at least one of a first determination result indicating quality of each of the plurality of inspection target positions (Bi), a second determination result indicating quality of an inspection target region (75) including at least one of the plurality of inspection target positions (Bi), and a third determination result indicating quality of the target (W) based on the determination of the determination part (21).

(Configuration 8)

A setting method in an appearance inspection system (1) that performs appearance inspection by imaging a target (W) using an imaging device (10) while causing a relative position between the target (W) and the imaging device (10) to be different, the setting method including:
deciding one imaging condition candidate or a plurality of imaging condition candidates including the relative position between the target (W) and the imaging device (10) in the inspection for each of a plurality of inspection target positions (Bi) on the target (W),
wherein in the deciding of the one imaging condition candidate or the plurality of imaging condition candidates, a plurality of imaging condition candidates are decided for at least one inspection target position (Bi) among the plurality of inspection target positions (Bi), and
wherein the setting method further comprises deciding a change route of the imaging condition for sequentially imaging the plurality of inspection target positions (Bi) by selecting the one imaging condition candidate or one of the plurality of imaging condition candidates decided for each of the plurality of inspection target positions as an imaging condition so that a pre-decided requirement is satisfied.

(Configuration 9)

A program supporting an appearance inspection system (1) that performs appearance inspection by imaging a target (W) using an imaging device (10) while causing a relative position between the target (W) and the imaging device (10) to be different, the program causing a computer to perform:
deciding one imaging condition candidate or a plurality of imaging condition candidates including the relative position between the target (W) and the imaging device (10) in the inspection for each of a plurality of inspection target positions on the target (W),
wherein in the deciding of the one imaging condition candidate or the plurality of imaging condition candidates, a plurality of imaging condition candidates are decided for at least one inspection target position among the plurality of inspection target positions, and
wherein the setting program causes the computer to further perform deciding a change route of the imaging condition for sequentially imaging the plurality of inspection target positions by selecting the one imaging condition candidate or one of the plurality of imaging condition candidates decided for each of the plurality of inspection target positions as an imaging condition so that a pre-decided requirement is satisfied.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An appearance inspection system that performs appearance inspection by imaging a target using an imaging device while causing a relative position between the target and the imaging device to be different, the appearance inspection system comprising:
a first decision part that decides one imaging condition candidate or a plurality of imaging condition candidates including the relative position between the target and the imaging device in the inspection for each of a plurality of inspection target positions on the target,
wherein the first decision part decides a plurality of imaging condition candidates for at least one inspection target position among the plurality of inspection target positions,
wherein the appearance inspection system further comprises a second decision part that decides a change route of the imaging condition for sequentially imaging the plurality of inspection target positions by selecting the one imaging condition candidate or one of the plurality of imaging condition candidates decided for each of the plurality of inspection target positions as an imaging condition so that a pre-decided requirement is satisfied,
wherein the second decision part calculates an evaluation value of each of a plurality of combination patterns in which at least one of an imaging order of the plurality of inspection target positions and the imaging condition decided for the plurality of inspection target positions is mutually different and decides the change route based on the evaluation value,
each of the plurality of combination patterns is a pattern in which a plurality of imaging conditions selected one by one from the plurality of imaging condition candidates decided for each of the plurality of inspection target positions are arranged in the imaging order of the plurality of inspection target positions, and
the combination patterns are virtual patterns that are not formed on the target, and
the combination patterns are virtual traveling paths designed for the imaging device, the change route is selected from one of the combination patterns based on the evaluation value, and the imaging device moves according to the selected combination pattern.

2. The appearance inspection system according to claim 1, wherein the imaging device includes an illumination part that radiates light to the target, a lens part that forms an image from light reflected from the target on an image sensor, and a camera control part that controls the image sensor to output image data, and
wherein the imaging condition includes at least one of an illumination condition of the illumination part, an optical condition of the lens part, and a control condition of the camera control part.

3. The appearance inspection system according to claim 2, further comprising:
a third decision part that sets one or more inspection target regions on the target and decides one or more inspection target positions corresponding to the inspection target region so that an inspection requirement corresponding to the inspection target region is satisfied.

4. A setting device that is used in the appearance inspection system according to claim 2 and sets the change route, the setting device comprising:
the first decision part and the second decision part.

5. An image processing device that is used in the appearance inspection system according to claim 2 and determines quality of an appearance of the target, the image processing device comprising:
a determination part that determines quality of the appearance of the target by processing an image captured on an imaging condition decided for each of the plurality of inspection target positions; and
an output part that outputs at least one of a first determination result indicating quality of each of the plurality of inspection target positions, a second determination result indicating quality of an inspection target region including at least one of the plurality of inspection target positions, and a third determination result indicating quality of the target based on the determination of the determination part.

6. The appearance inspection system according to claim 1, wherein the evaluation value is calculated using an evaluation function including a term that depends on a time necessary to complete imaging of all the plurality of inspection target positions while sequentially changing the imaging condition.

7. The appearance inspection system according to claim 6, further comprising:
a third decision part that sets one or more inspection target regions on the target and decides one or more inspection target positions corresponding to the inspection target region so that an inspection requirement corresponding to the inspection target region is satisfied.

8. The appearance inspection system according to claim 1, further comprising:
a third decision part that sets one or more inspection target regions on the target and decides one or more inspection target positions corresponding to the inspection target region so that an inspection requirement corresponding to the inspection target region is satisfied.

9. A setting device that is used in the appearance inspection system according to claim 1 and sets the change route, the setting device comprising:
the first decision part and the second decision part.

10. An image processing device that is used in the appearance inspection system according to claim 1 and determines quality of an appearance of the target, the image processing device comprising:
a determination part that determines quality of the appearance of the target by processing an image captured on an imaging condition decided for each of the plurality of inspection target positions; and
an output part that outputs at least one of a first determination result indicating quality of each of the plurality of inspection target positions, a second determination result indicating quality of an inspection target region including at least one of the plurality of inspection target positions, and a third determination result indicating quality of the target based on the determination of the determination part.

11. A setting method in an appearance inspection system that performs appearance inspection by imaging a target using an imaging device while causing a relative position between the target and the imaging device to be different, the setting method comprising:
deciding one imaging condition candidate or a plurality of imaging condition candidates including the relative position between the target and the imaging device in the inspection for each of a plurality of inspection target positions on the target,
wherein, in the deciding of the one imaging condition candidate or the plurality of imaging condition candidates, a plurality of imaging condition candidates are decided for at least one inspection target position among the plurality of inspection target positions,
wherein the setting method further comprises deciding a change route of the imaging condition for sequentially imaging the plurality of inspection target positions by selecting the one imaging condition candidate or one of the plurality of imaging condition candidates decided for each of the plurality of inspection target positions as an imaging condition so that a pre-decided requirement is satisfied,
wherein the setting method further comprises calculating an evaluation value of each of a plurality of combination patterns in which at least one of an imaging order of the plurality of inspection target positions and the imaging condition decided for the plurality of inspection target positions is mutually different and deciding the change route based on the evaluation value,
each of the plurality of combination patterns is a pattern in which a plurality of imaging conditions selected one by one from the plurality of imaging condition candidates decided for each of the plurality of inspection target positions are arranged in the imaging order of the plurality of inspection target positions, and
the combination patterns are virtual patterns that are not formed on the target, and
the combination patterns are virtual traveling paths designed for the imaging device, the change route is selected from one of the combination patterns based on the evaluation value, and the imaging device moves according to the selected combination pattern.

12. A non-transitory computer readable medium having a program stored thereon, the program supporting an appearance inspection system that performs appearance inspection by imaging a target using an imaging device while causing a relative position between the target and the imaging device to be different, the program causing a computer to perform:
deciding one imaging condition candidate or a plurality of imaging condition candidates including the relative position between the target and the imaging device in the inspection for each of a plurality of inspection target positions on the target,
wherein, in the deciding of the one imaging condition candidate or the plurality of imaging condition candidates, a plurality of imaging condition candidates are decided for at least one inspection target position among the plurality of inspection target positions,
wherein the setting program causes the computer to further perform deciding a change route of the imaging condition for sequentially imaging the plurality of inspection target positions by selecting the one imaging condition candidate or one of the plurality of imaging condition candidates decided for each of the plurality of inspection target positions as an imaging condition so that a pre-decided requirement is satisfied,
wherein the setting program causes the computer to further perform calculating an evaluation value of each of a plurality of combination patterns in which at least one of an imaging order of the plurality of inspection target positions and the imaging condition decided for the plurality of inspection target positions is mutually different and deciding the change route based on the evaluation value,
each of the plurality of combination patterns is a pattern in which a plurality of imaging conditions selected one by one from the plurality of imaging condition candidates decided for each of the plurality of inspection target positions are arranged in the imaging order of the plurality of inspection target positions, and
the combination patterns are virtual patterns that are not formed on the target, and
the combination patterns are virtual traveling paths designed for the imaging device, the change route is selected from one of the combination patterns based on the evaluation value, and the imaging device moves according to the selected combination pattern.

* * * * *